United States Patent
Thereska et al.

(10) Patent No.: US 8,370,672 B2
(45) Date of Patent: Feb. 5, 2013

(54) REDUCING POWER CONSUMPTION OF DISTRIBUTED STORAGE SYSTEMS

(75) Inventors: Eno Thereska, Cambridge (GB); Austin Donnelly, Cambridge (GB); Dushyanth Narayanan, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 12/714,223

(22) Filed: Feb. 26, 2010

(65) Prior Publication Data

US 2011/0213994 A1    Sep. 1, 2011

(51) Int. Cl.
    *G06F 1/32* (2006.01)
(52) U.S. Cl. .......................... 713/324; 713/320
(58) Field of Classification Search .................. 713/320, 713/322, 323, 324
    See application file for complete search history.

(56) References Cited

U.S. PATENT DOCUMENTS

| | | |
|---|---|---|
| 5,469,553 A | 11/1995 | Patrick |
| 6,925,529 B2 | 8/2005 | Bohrer et al. |
| 7,032,119 B2 | 4/2006 | Fung |
| 7,035,972 B2 | 4/2006 | Guha et al. |
| 7,043,650 B2 | 5/2006 | Bresniker et al. |
| 7,092,943 B2 | 8/2006 | Roese et al. |
| 7,093,149 B2 | 8/2006 | Tsirkel et al. |
| 7,600,137 B2 | 10/2009 | Trappeniers et al. |
| 7,673,161 B2 | 3/2010 | Freeman et al. |
| 8,074,014 B2 * | 12/2011 | Narayanan et al. ............ 711/112 |
| 2002/0167952 A1 | 11/2002 | Watson et al. |
| 2002/0177449 A1 | 11/2002 | McDonnell et al. |
| 2003/0217299 A1 | 11/2003 | Neuman et al. |
| 2004/0107273 A1 | 6/2004 | Biran et al. |
| 2004/0230848 A1 | 11/2004 | Mayo et al. |
| 2005/0044436 A1 | 2/2005 | Holle |
| 2005/0204027 A1 | 9/2005 | Claseman |
| 2006/0171329 A1 | 8/2006 | Ying |
| 2006/0251115 A1 | 11/2006 | Haque et al. |
| 2007/0006174 A1 | 1/2007 | Sohm et al. |
| 2007/0011472 A1 | 1/2007 | Cheng |
| 2007/0022121 A1 | 1/2007 | Bahar et al. |
| 2007/0079063 A1 | 4/2007 | Mizuno |

(Continued)

OTHER PUBLICATIONS

Abd-El-Malek, Courtright II, Cranor, Ganger, Hendricks, Klosterman, Mesnier, Prasad, Salmon, Sambasivan, Sinnamohideen, Strunk, Thereska, Wachs, Wylie, "Ursa Minor versatile cluster-based storage", retrieved on Dec. 30, 2009 at <<http://www.pdl.cmu.edu/PDL-FTP/SelfStar/ursaminor-fast05.pdf>>, USENIX Association, Proceedings of Conference on File and Storage Technology (FAST), Dec. 13, 2005, pp. 1-14.

(Continued)

*Primary Examiner* — Dennis M Butler

(74) *Attorney, Agent, or Firm* — Zete Law, P.L.L.C.; MacLane C. Key

(57) ABSTRACT

Methods for reducing the power consumption of distributed storage systems are described. An embodiment describes a storage system which is adapted to reduce its power consumption at times of low load by reducing the number of active versions of the stored data. The data to be stored in the storage system is divided into chunks and in an example, each chunk is replicated on a number of different servers. At times of low load, the system enters a mode of operation in which the number of active replicas is reduced and servers that do not store any active replicas are put into a low power state. When in this mode, writes are written to a versioned store and the data is subsequently copied to servers storing replicas once all the servers have returned to normal power state.

20 Claims, 14 Drawing Sheets

U.S. PATENT DOCUMENTS

| | | | |
|---|---|---|---|
| 2007/0136489 | A1 | 6/2007 | Temoshenko et al. |
| 2007/0150713 | A1 | 6/2007 | Almeida et al. |
| 2007/0162582 | A1 | 7/2007 | Belali et al. |
| 2008/0276016 | A1 | 11/2008 | Fujibayashi |
| 2008/0276042 | A1 | 11/2008 | Hetzler et al. |
| 2009/0063878 | A1 | 3/2009 | Schmidt et al. |
| 2009/0249001 | A1* | 10/2009 | Narayanan et al. ........... 711/161 |
| 2010/0023788 | A1 | 1/2010 | Scott et al. |
| 2010/0036834 | A1 | 2/2010 | Bandas |
| 2010/0106903 | A1 | 4/2010 | Fujibayashi et al. |
| 2010/0169678 | A1 | 7/2010 | Kozuka |
| 2010/0257142 | A1 | 10/2010 | Murphy et al. |
| 2010/0287397 | A1* | 11/2010 | Naor et al. .................... 713/324 |

OTHER PUBLICATIONS

"Advanced Power Management", COPAN Systems, 2007, pp. 1-2.

Anderson, et al., "Serverless Network File Systems" ACM, 1995, pp. 1-21.

Aranya, et al., "Tracefs A File System to Trace Them All" In Proc. USENIX Conference on File and Storage Technologies (FAST 2004), 2004, pp. 15.

Baker, et al., "Measurements of a Distributed File System", ACM, 1991, pp. 198-212.

Baker, et al., "Non-Volatile Memory for Fast, Reliable File Systems" In Proc. International Conference on Architectural Support for Programming Languages and Operating Systems (ASPLOS 1992), pp. 1-13.

Barroso, Holzle, "The Case for Energy-Proportional Computing", retrieved on Dec. 30, 2009 at <<http://www.cra.org/ccc/docs/ieee_computer07.pdf>>, IEEE Computer Society Press, vol. 40, No. 12, Dec. 2007, pp. 33-37.

Battles, et al., "Reducing Data center Power Consumption through Efficient Storage" ,<<http://www.netapp.com/ftp/wp-reducing-datacenter-power-consumption.pdf>> pp. 8.

Carrera, et al., "Conserving Disk energy in network servers", ACM, 2003, pp. 12.

Chase, et al., "Managing energy and server resources in hosting centers", Department of Computer Science, pp. 14.

"Cheetah 10K.7", Seagate Technology LLC, 2004, pp. 2.

Colarelli, et al.,"Massive Arrays of Idle Disks for Storage Archives" IEEE, 2002, pp. 11.

Dahlin, et al.,"Cooperative Caching: Using Remote Client Memory to Improve File System Performance" In Proc. Symposium on Operating Systems Design and Implementation (OSDI 1994), pp. 14.

DataDirect Networks <<http://www.datadirectnet.com>>, pp. 3.

DeCandia, Hastorun, Jampani, Kakulapati, Lakshman, Pilchin, Sivasubramanian, Vosshall, Vogels, "Dynamo: Amazon's Highly Available Key-value Store", retrieved on Dec. 30, 2009 at <<http://s3.amazonaws.com/AllThingsDistributed/sosp/amazon-dynamo-sosp2007.pdf>>, ACM SIGOPS Operating Systems Review (SOSP), vol. 41, No. 6, 2007, pp. 205-220.

Ganesh, et al.,"Optimizing Power Consumption in Large Scale Storage Systems", <<http://www.cs.cornell.edu/projects/quicksilver/public_pdfs/lfs07.pdf>>, pp. 6.

Ghemawat, Gobioff, Leung, "The Google File System", retrieved on Dec. 30, 2009 at <<http://labs.google.com/papers/gfs-sosp2003.pdf>>, ACM SIGOPS Operating Systems Review (SOSP), vol. 37, No. 5, Oct. 19, 2003, pp. 29-43.

Gurumurthi, et al.,"DRPM Dynamic Speed Control for Power Management in Server Class Disks". In Proc. International Symposium on Computer Architecture (ISCA 2003), San Diego, pp. 11.

Gurumurthi, et al., "Interplay of Energy and Performance for Disk Arrays Running Transaction Processing Workloads", IBM Research Division, pp. 10.

Hamilton, "Resource Consumption Shaping", retrieved on Dec. 31, 2009 at <<http://perspectives.mvdirona.com/2008/12/17/ResourceConsumptionShaping.aspx>>, Dec. 17, 2008, pp. 1-5.

"Intel Corporation, Dual-Core Intel R Xeon R Processor", Intel Corporation , 2004-2006, pp. 104.

Jiang, Parashar, "Enabling Autonomic Power-Aware Management of Instrumented Data Centers", retrieved on Dec. 30, 2009 at <<http://ieeexplore.ieee.org/stamp/stamp.jsp?arnumber=05160976>>, IEEE Computer Society, Proceedings of Symposium on Parallel and Distributed Processing (IPDPS), 2009, pp. 1-8.

Joukov, et al.,"Accurate and Efficient Replaying of File System Traces". In Proc. USENIX Conference on File and Storage Technologies (FAST 2005), 2005, pp. 14.

Kim, et al., "Power Management in Disk Storage System with Multiple RPM Levels", pp. 1.

Krishnan, et al., "Thwarting the power-hungry disk", USENIX Winter, 1994, pp. 15.

Li, et al., "EERAID Energy Efficient Redundant and Inexpensive Disk Arrays". ACM,2004, pp. 1-14.

"Managing Enterprise Storage", <<http://www.informationweek.com/news/showArticle.jhtml?articleID=202404374>>, pp. 1-4.

"Microsoft. Event tracing" <<http://msdn.microsoft.com/en-gb/library/bb968803(VS.85).aspx>> retrieved from the internet on Aug. 12, 2008, 1 page.

"NAND Flash-Based Solid State Disk" Samsung Electronics, 2007, pp. 1-62.

Narayanan, Donnelly, Thereska, Elnikety, Rowstron, "Everest: Scaling down peak loads through I/O off-loading", retrieved on Dec. 30, 2009 at <<http://research.microsoft.com/pubs/68163/Everest-OSDI08.pdf>>, USENIX Association, Proceedings of OSDI, Dec. 2008, pp. 1-14.

Narayanan, et al., "Write Off-Loading Practical Power Management for Enterprise Storage", pp. 15.

News release<<http://www.hp.com/hpinfo/newsroom/press/2007/070625xa.html>>, pp. 1-3.

Nightingale, et al., "Energy-efficiency and storage flexibility in the blue file system", pp. 16.

Ellard, et al., "Passive NFS Tracing of Email and Research Workloads". In Proc. USENIX Conference on File and Storage Technologies (FAST 2003), 2003, pp. 23.

Pinheiro, et al., "Energy Conservation Techniques for Disk Array-Based Servers". ACM, 2004, pp. 11.

Pinheiro, et al., "Failure Trends in a Large Disk Drive Population". In Proc. USENIX Conference on File and Storage Technologies (FAST2007), pp. 13.

Yao, et al., "RIMAC A Novel Redundancy Based Hierarchical Cache Architecture for Energy Efficient, High Performance Storage Systems". ACM, 2006, pp. 14.

Rosenblum, et al., "The Design and Implementation of a Log-Structured File System". ACM, 1992, pp. 1-15.

Ruemmler, et al., "UNIX Disk Access Patterns". In Proc. USENIX Winter 1993 Technical Conference, pp. 17.

Saito, Frolund, Veitch, Merchant, Spence, "FAB: Building Distributed Enterprise Disk Arrays from Commodity Components", retrieved on Dec. 30, 2009 at <<http://www.hpl.hp.com/research/ssp/papers/2004-10-ASPLOS-FAB.pdf>>, ACM SIGARCH Computer Architecture News (ASPLOS Conference), vol. 32, No. 5, Dec. 2004, pp. 48-58.

"SanDisk SSD UATA 5000 1.8", San Disk Corporation, 2007, pp. 35.

Schneider, "Implementing Fault-Tolerant Services Using the State Machine Approach: A Tutorial", retrieved on Dec. 30, 2009 at <<http://www.cs.cornell.edu/fbs/publications/SMSurvey.pdf>>, ACM Computing Surveys (CSUR), vol. 22, No. 4, Dec. 1990, pp. 299-319.

Schroeder et al.,"Disk Failures in the Real World: What Does an MTTF of 1,000,000 Hours Mean to You?" In Proc. USENIX Conference on File and Storage Technologies (FAST2007), pp. 17.

Seltzer, et al., "An Implementation of a Log-Structured File System for UNIX". In Proc. USENIX Winter 1993 Conference, pp. 20.

"SNIA IOTTA Repository", retrieved on Dec. 31, 2009 at <<http://iotta.snia.org/>>, Storage Networking Industry Association, 2008, pp. 1-3.

Thereska, Donnelly, Narayanan, "Sierra: a power-proportional, distributed storage system", retrieved on Feb. 24, 2010 at <<http://research.microsoft.com/pubs/112503/sierra-TR.pdf>>, Microsoft Corporation, Microsoft Tech Report MSR-TR-2009-153, Nov. 2009, pp. 1-15.

van Renesse, Schneider, "Chain Replication for Supporting High Throughput and Availability", retrieved on Dec. 30, 2009 at <<http://www.cs.cornell.edu/home/rvr/papers/osdi04.pdf>>, USENIX Association, Proceedings of Conference on Symposium on Opearting Systems Design and Implementation (OSDI), vol. 4, 2004, pp. 91-104.

Wachs, Abd-El-Malek, Thereska, Ganger, "Argon: performance insulation for shared storage servers", retrieved on Dec. 30, 2009 at << http://www.pdl.cmu.edu/PDL-FTP/Storage/argon-fast07.pdf>>, USENIX Association, Conference on File and Storage Technologies (FAST), Supercedes Carnegie Mellon University Parallel Data Lab Technical Report CMU-PDL-06-106 (May 2006), Feb. 13, 2007, pp. 1-16.

Weddle, et al., "PARAID The Gearshifting Power-Aware RAID". In Proc. USENIX Conference on File and Storage Technologies (FAST 2007), 2007, pp. 16.

"Windows Azure Platform", retrieved on Dec. 31, 2009 at <<http://www.microsoft.com/windowsazure/>>, 2009, pp. 1-2.

Zedlewski, et al., "Modeling harddisk power consumption.", <<http://www.cs.princeton.edu/~rywang/papers/fast03/dempsey.pdf>>, pp. 14.

Zhu, et al.,"Hibernator: Helping Disk Arrays Sleep Through the Winter". ACM, 2005, pp. 14.

Zhu, et al., "Power-Aware Storage Cache Management". IEEE, pp. 35.

Zhu, Zhou, "Power-Aware Storage Cache Management", retrieved on Dec. 30, 2009 at <<http://ieeexplore.ieee.org/stamp/stamp.jsp?arnumber=01407848>>, IEEE Computer Society, Transactions on Computers, vol. 54, No. 5, May 2005, pp. 587-602.

Zhu, et al., "TBBT Scalable and Accurate Trace Replay for File Server Evaluation". ACM, 2005, pp. 2.

U.S. Appl. No. 11/945,104, filed Nov. 26, 2007, Stephen Hodges, Yuvraj Agarwal, Paramvir Bahl, Ranveer Chandra, Scott James, "Low-Power Operation of Networked Devices". 35 pages.

U.S. Appl. No. 12/059,695, filed Mar. 31, 2008, Dushyanth Narayanan, Austin Donnelly, Sameh Elnikety, Antony Rowstron, Eno Thereska, "Storage Systems Using Write Off-Loading".

"Active Notifications White Paper", Microsoft Corporation, Nov. 2006, pp. 16.

Agarwal, et al., "Dynamic Power Management using on Demand Paging for Networked Embedded Systems", IEEE, 2005, pp. 755-759.

Agarwal, et al., "On Demand Paging Using Bluetooth Radios on 802.11 Based Networks", CECS, Jul. 2003, pp. 19.

Agarwal, et al., "Somniloquy: Augmenting Network Interfaces to Reduce PC Energy Usage", retrieved on Nov. 22, 2010 at <<http://research.microsoft.com/pubs/79419/agarwal-NSDI09-Somniloquy.pdf>>, USENIX Association, Proceedings of Symposium on Networked Systems Design and Implementation (NSDI), Boston, Massachusetts, Apr. 2009, pp. 365-380.

Agarwal et al., "Somniloquy: Maintaining Network Connectivity While Your Computer Sleeps", Mircosoft Research MSR-TR-2008-42, Mar. 2008 pp. 1-pp. 14.

Agarwal, et al., "Wireless Wakeups Revisited: Energy Management for VoIP over Wi-Fi Smartphones", ACM, 2007, pp. 14.

"Autonomous Mode Operation for Marvell USB 8388", retrieved on Sep. 27, 2007, at <<http://dev.laptop.org/ticket/1060.>>, pp. 5.

Bahl, et al., "Wake on Wireless—a Case for Multi Radio Wireless LAN", Apr. 4, 2002, pp. 47.

Battles, et al., "Reducing Data center Power Consumption through Efficient Storage", >>http://www.netapp.com/ftp/wp-reducing-datacenter-power-consumption.pdf>> pp. 8.

"Cell2Notify: Caller ID Based Notifications on Smartphones", at <<http://research.microsoft.com/netres/projects/cell2notify/>>, Microsoft Corporation, 2007, pp. 1.

Decker, "Requirements for a Location-Based Access Control Model", retrieved on Aug. 26, 2010 at <<http://delivery.acm.org/10.1145/1500000/1497259/p346-decker.pdf?key1=1497259&key2=2653182821&coll=GUIDE&dl=GUIDE&CFID=101946902&CFTOKEN=51824440>>, ACM, Proceedings of Intl Conference on Advances in Mobile Computing and Multimedia (MoMM), Linz, Austria, Nov. 2008, pp. 346-349.

"Dropbox—Online backup, file sync, and sharing made easy", retrieved on Apr. 4, 2011 at <<https://www.dropbox.com>>, Dropbox, 2011, pp. 1.

Gashti, et al., "An UPnP-based context-aware framework for ubiquitous mesh home networks", retrieved on Nov. 22, 2010 at <<http://ieeexplore.ieee.org/stamp/stamp.jsp?arnumber=05449966>>, IEEE Intl Symposium on Personal, Indoor and Mobile Radio Communications (PIMRC), Tokyo, Japan, Sep. 2009, pp. 400-404.

Gibson, et al., "A Cost-Effective, High-Bandwidth Storage Architecture", retrieved on Nov. 22, 2010 at <<http://www.pdl.cmu.edu/ftp/NASD/asplos98.pdf>>, ACM, Proceedings of Conference on Architectural Support for Programming Languages and Operating Systems (ASPLOS), San Jose, California, Oct. 1998, pp. 92-103.

Gobioff, "Security for a High Performance Commodity Storage Subsystem", retrieved on Aug. 26, 2010 at <<http://www.pdl.cmu.edu/PDL-FTP/NASD/hbg_thesis.pdf>>, Carnegie Mellon University, School of Computer Science, Doctoral Thesis, Jul. 1999, pp. 1-222.

Hunt, et al., "Detours: Binary Interception of Win32 Functions", retrieved on Nov. 22, 2010 at <<http://research.microsoft.com/pubs/68568/huntusenixnt99.pdf>>, Usenix Association, Proceedings of Windows NT Symposium (WINSYM). Seattle, Washington, vol. 3, Jul. 1999, pp. 1-9.

"Industry Report—Digital Lifestyles: 2010 Outlook", retrieved on Apr. 4, 2011 at <<http://www.parksassociates.com/report/digital-lifestyles-2010-outlook>>, Parks Associates, 2010, pp. 1-2.

"Industry Report—Home Networks for Consumer Electronics", retrieved on Apr. 4, 2011 at <<http://www.parksassociates.com/report/home-networks-for-consumer-electronics>>, Parks Associates, 2009, pp. 1-4.

"Intel Centrino Mobile Technology Wake on Wireless LAN (WoWLAN) Feature", Intel Corporation, 2006, pp. 6.

Kim et al., "Power Management in Disk Storage System with Multiple RPM Levels," ACEED, Mar. 1, 2005, pp. 1.

Kistler, et al., "Disconnected Operation in the Coda File System", retrieved on Nov. 22, 2010 at <<http://www.cs.cmu.edu/~coda/docdir/s13.pdf>>, ACM Transactions on Computer Systems, vol. 10, No. 1, Feb. 1992, pp. 3-25.

Kotsovinos, et al., "replic8: Location-aware data replication for high availability in ubiquitous environments", retrieved on Aug. 26, 2010 at <<http://www.kotsovinos.com/research/papers/replic8.pdf>>, Springer-Verlag Berlin, LNCS vol. 3510, Proceedings of Intl Conference on Wired/Wireless Internet Communications (WWIC), Xanthi, Greece, May 2005, pp. 32-41.

Kumar, et al., "Single-ISA Heterogeneous Multi-Core Architectures: The Potential for Processor Power Reduction", Proceedings of the 36th International Symposium on Microarchitecture, Dec. 2003, pp. 12.

Mayo, et al., "Energy Consumption in Mobile Devices: Why Future Systems Need Requirements-Aware Energy Scale-Down", Hewlett-Packard Company, 2003, pp. 10.

Mazurek, et al., "Access Control for Home Data Sharing: Attitudes, Needs and Practices", retrieved on Nov. 22, 2010 at <<http://lorrie.cranor.org/pubs/chi2010-access-control.pdf>>, ACM, Proceedings of Intl Conference on Human Factors in Computing Systems (CHI), Atlanta, Georgia, Apr. 2010, pp. 645-654.

Mishra, et al., "Wake-on-WLAN", ACM, 2006, pp. 9.

News release<<http://www.hp.com/hpinfo/newsroom/press/2007/070625xa.html, pp. 1-3.

Olsen, et al., "Multi-Processor Computer System Having Low Power Consumption", Springer-Verlag Berlin Heidelberg, 2003, pp. 53-67.

Pering, et al., "CoolSpots: Reducing the Power Consumption of Wireless Mobile Devices with Multiple Radio Interfaces", ACM, 2006, pp. 220-232.

Pering, et al., "Exploiting Radio Hierarchies for Power-Efficient Wireless Device Discovery and Connection Setup", IEEE, 2005, pp. 6.

"Physically Connecting to a Network or Broadband Modem", at <<http://support.dell.com/support/edocs/system/latd820/en/ug/network.htl>>, Dell, 2007, pp. 12.

Ramasubramanian, et al., "Cimbiosys: A Platform for Content-Based Partial Replication", retrieved on Nov. 22, 2010 at <<http://research.microsoft.com/pubs/56258/tr-2008-116.pdf>>, USENIX Association, Proceedings of Symposium on Networked Systems Design and Implementation (NSDI), Boston, Massachusetts, Apr. 2009, pp. 261-276.

Ray, et al., "A Spatio-Temporal Role-Based Access Control Model", retrieved on Aug. 26, 2010 at <<http://citeseerx.ist.psu.edu/viewdoc/download?doi=10.1.1.160.3506&rep=rep1&type=pdf>>, Springer-Verlag Berlin, Proceedings of Conference on Data and Applications Security, Redondo Beach, California, 2007, pp. 211-226.

Rodden, et al., "Best of Both Worlds: Improving Gmail Labels with the Affordances of Folders", retrieved on Nov. 22, 2010 at <<http://static.googleusercontent.com/external_content/untrusted_dlcp/www.google.com/en/us/research/pubs/archive/36334.pdf>>, ACM, Proceedings of Intl Conference on Human Factors in Computing Systems (CHI), Atlanta, Georgia, Apr. 2010, pp. 4587-4596.

Salmon, et al., "Perspective: Semantic data management for the home", retrieved on Nov. 22, 2010 at <<http://www.pdl.cmu.edu/PDL-FTP/Storage/salmon-fast09.pdf>>, USENIX Association, Proceedings of Conference on File and Storage Technologies (FAST), San Francisco, California, Feb. 2009, pp. 167-182.

Seltzer, et al., "Hierarchical File Systems are Dead", retrieved on Nov. 22, 2010 at <<http://www.usenix.org/event/hotos09/tech/full_papers/seltzer/seltzer.pdf>>, USENIX Association, Proceedings of Conference on Hot Topics in Operating Systems (HotOS), Monte Verita, Switzerland, May 2009, pp. 1-5.

Shih, et al., "Wake on Wireless: An Event Driven Energy Saving Strategy for Battery Operated Devices", ACM, 2002, pp. 12.

Sobti, et al., "Segank: A Distributed Mobile Storage System", retrieved on Nov. 2, 2010 at <<http://www.cs.princeton.edu/~rywang/papers/fast04/segank.pdf>>, USENIX Association, Proceedings of Conference on File and Storage Technologies (FAST), San Francisco, California, 2004, pp. 239-252.

Sorber, et al., "Turducken: Hierarchical Power Management for Mobile Device", pp. 14.

Strauss, et al., "Device Transparency: a New Model for Mobile Storage", retrievd on Nov. 22, 2010 at <<http://pdos.csail.mit.edu/papers/eyo-hotstorage09.pdf>>, ACM SIGOPS Operating Systems Review, vol. 44, No. 1, Jan. 2010, pp. 5-9.

Stuedi, et al., "WhereStore: Location-based Data Storage for Mobile Devices Interacting with the Cloud", retrieved on Aug. 26, 2010 at <<http://delivery.acm.org/10.1145/1820000/1810932/a1-stuedi.pdf?key1=1810932&key2=9748082821&coll=GUIDE&dl=GUIDE&CFID=101936225&CFTOKEN=37599229>>, ACM, Proceedings of Workshop on Mobile Cloud Computing and Services: Social Networks and Beyond (MCS), San Francisco, California, Jun. 2010, pp. 1-8.

Terry, et al., "Managing Update Conflicts in Bayou, a Weakly Connected Replicated Storage System", retrieved on Nov. 22, 2010 at <<http://citeseerx.ist.psu.edu/viewdoc/download;jsessionid=C655550F24E44FE98C6D7041A8AD77CA?doi=10.1.1.12.7323&rep=rep1&type=pdf>>, ACM, Proceedings of Symposium on Operating Systems Principles (SOSP), Copper Mountain Resort, Colorado, Dec. 1995, pp. 172-183.

"Toshiba Leading Innovation", at <<http://www.toshibadirect.com/td/b2c/ebtext.to?page=r400_micro_f>>, 2007, pp. 2.

Wang, et al., "LOCK: A Highly Accurate, Easy-to-Use Location-based Access Control System", retrieved on Aug. 26, 2010 at <<http://itcs.tsinghua.edu.cn/~yongcai/data/LOCK_of_LoCA09.pdf>>, Springer-Verlag Berlin, LNCS vol. 5561, Proceedings of Location and Context Awareness (LoCA), Tokyo Japan, 2009, pp. 254-270.

Whitehead, "Welcome to WebDAV Resources", retrieved on Apr. 4, 2011 at <<http://www.webdav.org>>, Apr. 2010, pp. 1-4.

"Windows live sync", retrieved on Apr. 4, 2011 at <<http://sync.live.com>>, Microsoft Corporation, 2011, pp. 1.

Yang, et al., "On Effective Offloading Services for Resource-Constrained Mobile Devices Running Heavier Mobile Internet Applications", retrieved on Nov. 22, 2010 at <<http://awin.cs.ccu.edu.tw/magazine/IEEE_com/2008/002.pdf>>, IEEE Communications Magazine, Jan. 2008, pp. 56-61.

Allman, et al., "Enabling an Energy-Efficient Future Internet Through Selectively Connected End Systems", ACM SIGCOMM HotNets, 2007, pp. 1-7.

Anand, et al., "SelfTuning Wireless Network Power Management", ACM MobiCom 2003 (1581137532/03/0009), 2003, pp. 176-189.

Benini, et al., "A Survey of Design Techniques for System-Level Dynamic Power Management", IEEE VLSI Transactions (1063 8210/00), vol. 8, No. 3, 2000, pp. 299-316.

Borisov, et al., "Generic Application-Level Protocol Analyzer and its Language", Microsoft Research, MSR-TR-2005-133, 2005, pp. 1-15.

Douglis, et al., "Thwarting the Power-Hungry Disk", USENIX Winter Technical Conference, 1994, pp. 292-306.

Flautner, "Automatic Performance Setting for Dynamic Voltage Scaling", MobiCom 2001, 2001, pp. 260-271.

Flinn, et al., "Managing Battery Lifetime with Energy-Aware Adaptation", ACM Transactions on Computer Systems, vol. 22, No. 2, 2004, pp. 137-179.

Gunaratne, et al., "Managing energy consumption costs in desktop PCs and LAN switches with proxying, split TCP connections, and scaling of link speed", John Wiley & Sons, Ltd.: International Journal of Network Management, vol. 15, No. 5, 2005, pp. 297-310.

Gupta, et al., "Greening of the internet", ACM SIGCOMM 2003 (1-58113-735-4/03/0008), 2003, pp. 19-26.

Huang, et al., "Design and Implementation of Power-Aware Virtual Memory", USENIX Annual Technical Conference, 2003, pp. 57-70.

Kravets, et al., "Application-Driven Power Management for Mobile Communication", Wireless Networks, vol. 6, No. 4, 2000, pp. 263-277.

Mogul, "TCP offload is a dumb idea whose time has come", IEEE HotOS, vol. 9, 2003, pp. 25-30.

Sabhanatarajan, et al., "Smart-NICs: Power Proxying for Reduced Power Consumption in Network Edge Devices", IEEE ISVLSI 2008, 2008, pp. 75-80.

Simunic, et al., "Dynamic Power Management for Portable Systems", ACM MobiCom 2000, 2000, pp. 11-19.

"TCP Offload Engine", retrieved on Mar. 7, 2008 at <<http://en.wikipedia.org/wiki/TCP_Offload_Engine>>, Wikipedia, 2008, pp. 1-5.

* cited by examiner

Logger data structures

Log client data structures

US 8,370,672 B2

REDUCING POWER CONSUMPTION OF DISTRIBUTED STORAGE SYSTEMS

BACKGROUND

Data centers, whether large or small, have a high power consumption which increases the total cost of ownership and contributes significantly to an organization's carbon footprint. The workload of a data center typically shows a diurnal variation with peak and trough periods, but the power consumption is proportional to the peak load that the system is provisioned for and not proportional to the system load at a particular time (which is referred to as 'power proportionality'). Power management features for server CPUs (central processing units), such as dynamic voltage scaling, can be used to reduce power consumption significantly during troughs in an attempt to make a system more power proportional. Storage is, however, not power proportional and this limits the power proportionality of the whole data center.

The embodiments described below are not limited to implementations which solve any or all of the disadvantages of known data centers and their storage systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods for reducing the power consumption of distributed storage systems are described. An embodiment describes a storage system which is adapted to reduce its power consumption at times of low load by reducing the number of active versions of the stored data. The data to be stored in the storage system is divided into chunks and in an example, each chunk is replicated on a number of different servers. At times of low load, the system enters a mode of operation in which the number of active replicas is reduced and servers that do not store any active replicas are put into a low power state. When in this mode, writes are written to a versioned store and the data is subsequently copied to servers storing replicas once all the servers have returned to normal power state.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
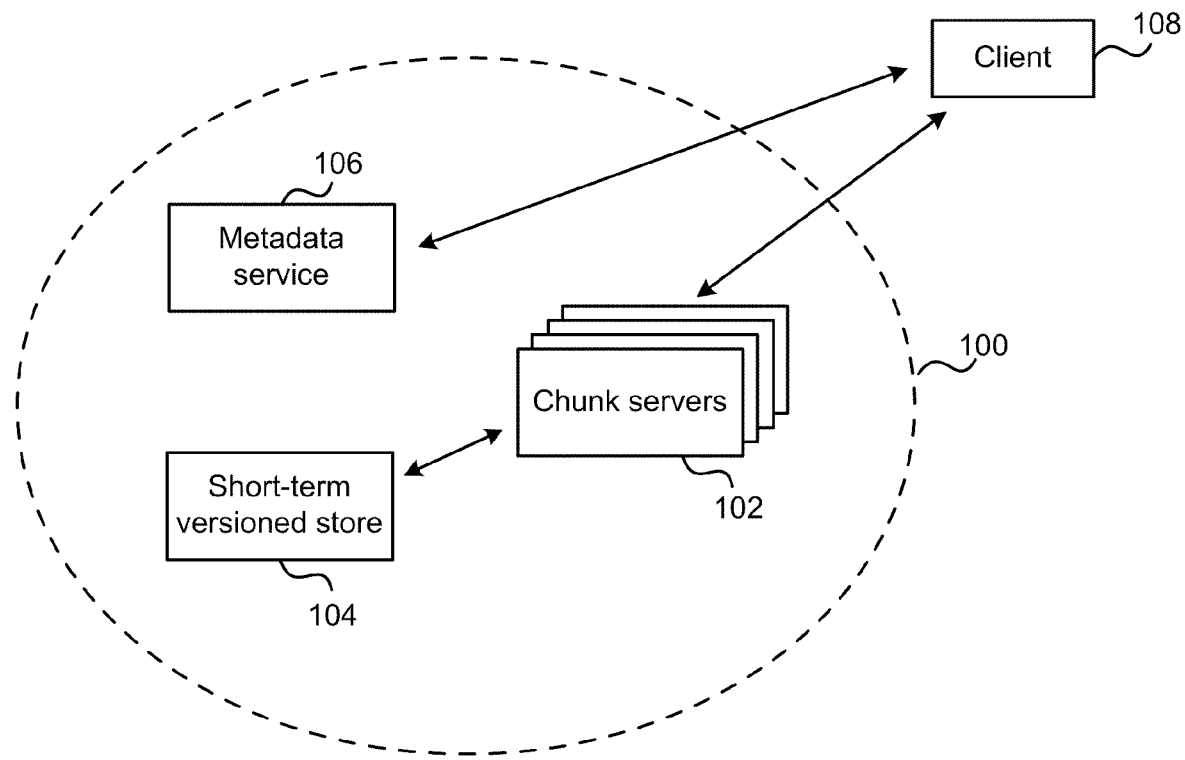
FIG. 1 is a schematic diagram of a storage system which is adapted to reduce its power consumption at times of low load.
Figure 2:
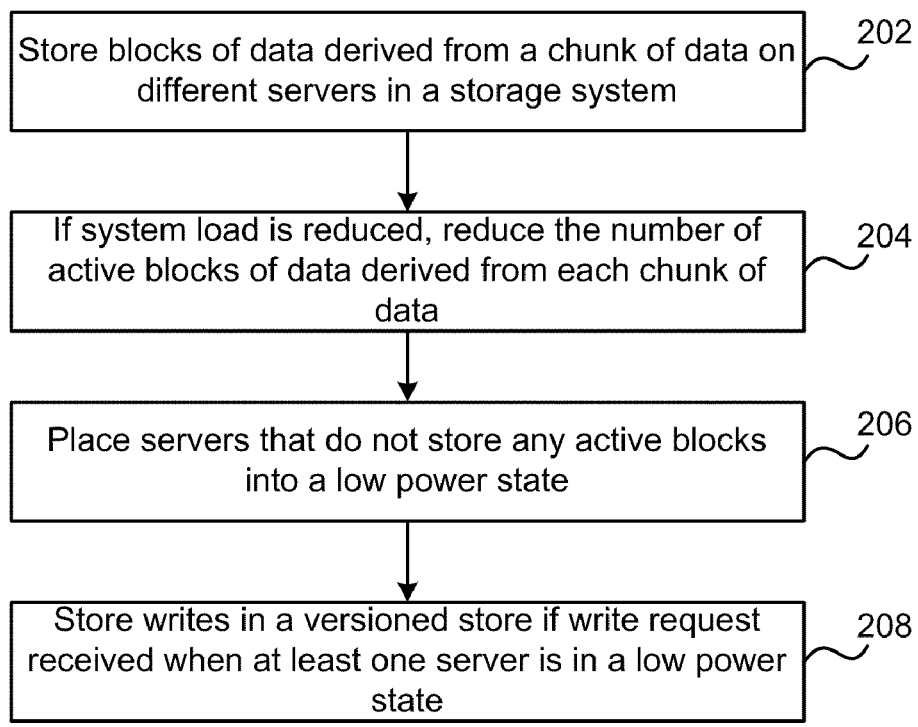
FIGS. 2 and 3 are flow diagrams of example methods of operation of a storage system.

FIG. 1 is a schematic diagram of a storage system 100 which is adapted to reduce its power consumption at times of low load, as can be described with reference to the flow diagram in FIG. 2. The system 100 comprises a number of servers 102, a short-term versioned store 104 and a metadata service 106. The servers 102 are connected by a network (not shown in FIG. 1) which also connects them to the short-term versioned store 104 and the metadata service 106. The arrows in FIG. 1 represent some of the communication paths within the system; however, it will be appreciated that messages and data may flow in directions not shown in FIG. 1. In an embodiment the servers 102 are geographically co-located and the network which interconnects them may be a low latency network.

The system 100 provides read/write access to data objects in units of chunks, where the chunk size is a system parameter (e.g. 64 MB or 1 MB) and consequently the servers may be referred to as 'chunk servers'. Write requests may overwrite existing data and/or append new data and client read and writes may be for arbitrary byte ranges within a chunk. A number, r, of blocks of data derived from a chunk are stored in the system, with derived blocks being stored on different chunk servers 102 (block 202). In an embodiment of the system which uses replication, each block of data derived from a chunk comprises a replica of the chunk. In another embodiment which uses erasure coding, the original chunk is encoded such that the chunk can be recovered from any m of r fragments of the encoded chunk and a block of data derived from a chunk comprises a fragment of the encoded chunk.

At times of reduced system load, the number of active blocks of data derived from a chunk (e.g. the number of replicas) is reduced (block 204, e.g. from r blocks to less than r blocks) and those servers in the system which do not store any active blocks are put into a low power state (block 206). The system load may be defined in terms of I/O requests and may be determined using predictions (e.g. based on historic load data) and/or measurements of current system load. Putting a subset of the servers in the system into a low power state reduces the power consumption of the system; however, the servers which are in a low power state are unavailable for servicing read and write requests. If at least one replica of a chunk (or m fragments, if erasure coding is used) remains active, this can be used to service any read requests received, but if all replicas (or less than m fragments) are inactive, there will be delay while a server exits the low power state (a process which may be referred to as 'waking up') before the request can be serviced. In an embodiment using erasure coding, it may be necessary to wake up more than one server such that m fragments are available. If a write request is received for a chunk of data at a time when some of the servers are unavailable, the write is stored in the versioned store 104 (block 208).

Any suitable low power state may be used (in block 206) and examples include turning the server off, putting it into suspend/standby and spinning down the disks. Different low power states have different power consumptions and by turning the servers off (in block 206), the largest reduction in power consumption can be achieved. However, the time taken for a server to power up is considerably longer than the time taken to exit standby/suspend or to spin up a disk and depending on the system requirements, different low power states may be appropriate. In some embodiments, a storage system may use more than one different low power state (e.g. some servers may be switched off and other servers may be in standby).

The following description refers to systems which use replication by way of example only and the methods and systems described herein may alternatively use erasure coding or a combination of replication and error coding (e.g. as described below with reference to FIG. 13).

As described above, at times of reduced system load, the number of active replicas of a chunk of data is reduced (in block 204), e.g. the number of active replicas of each chunk may be reduced from r to a value less than r. The system may be described as functioning in one of a number of different modes of operation (which may be referred to as 'gears'), where in any mode of operation, g replicas of a chunk are considered active and the remaining r-g replicas of a chunk are considered inactive (g≦r). The gear used may be dependent upon the predicted and/or current system load and an example of a load prediction (and hence gear prediction) algorithm is described below. In the highest gear, all r replicas of a chunk (e.g. g=r=3) are considered active but in other gears, a reduced number of replicas of a chunk (e.g. g=[0, 1, 2]) are considered active and chunk servers that do not store any active replicas of chunks are put into a low power state (e.g. switched off, suspended, or disks spun down).

In the lowest gear, $g_{min}$ replicas of a chunk are considered active (where $g_{min}<r$) and the value of $g_{min}$ may be a system parameter or policy input (e.g. $g_{min}=1$). The value of $g_{min}$ may be based on a number of factors such as the desired power saving (lower values of $g_{min}$ give more power saving), availability (higher values of $g_{min}$ provide higher availability) and any performance targets (which may for example be defined in terms of availability, latency etc).

In the limit, $g_{min}=0$, such that all servers are in a low power state (e.g. switched off) in the lowest gear; however, this would result in a latency penalty of waiting for a server to exit low power state (e.g. start up) to service a request (e.g. a read/write request) and consequently for many systems $g_{min}>0$ (e.g. $g_{min}=1$ or 2). The latency penalty in an embodiment where $g_{min}=0$ would depend on the low power state and particular apparatus used; however, if a server is switched off, the time taken to switch on may result in a significant delay. Where $g_{min}>0$, I/O requests are not blocked waiting for a component to wake up from a low power state but can instead be serviced by a server holding an active replica of the data or written to the versioned store, as appropriate. In embodiments using erasure coding, a minimum of m fragments (from the total of r fragments) need to be available in order that read requests can be serviced and consequently in such embodiments, the value of $g_{min}$ may be set to: $g_{min} \geq m$. By setting a suitable value of $g_{min}$ embodiments of the systems described herein can provide good availability and performance to users during times of low system load when the system is operating in a reduced gear.

By switching between gears dependent upon the system load (e.g. predicted and/or current load), the power consumption of the storage system can be made more power proportional. Experimental results have shown that power savings of at least 23% are possible for a large email service (obtained by replaying live server traces) and that power savings of up to 60% are possible for a small enterprise (determined by analysis of server load). Power savings may also be achieved in other applications, e.g. for large, scalable and highly available services such as cloud computing. Experimental results have also shown that for a three-way replicated system, significant power savings can still be achieved where $g_{min}=2$.

For a given chunk, one of the active replicas of a chunk (e.g. one of the replicas) is denoted as the primary at any given time with the other replicas being secondaries and over time the replica which is denoted as primary may change. At any time a chunk server will be the primary for some of the chunks stored on it (i.e. where the chunk server stores a replica of the chunk which is currently considered the primary) and a secondary for the others (i.e. where the chunk server stores a secondary replica of the chunk). Client read and write requests for a particular chunk (or portion thereof) are sent to the primary chunk server which determines request ordering and ensures read/write consistency. The term 'primary' may be used herein to refer to either the replica which is currently denoted as primary or to the chunk server which holds the replica which is currently denoted as primary. The system may be load balanced by spreading a large number of chunks substantially uniformly over a smaller number of chunk servers and by choosing the primaries for each chunk substantially randomly from the available replicas (e.g. replicas) of that chunk.

The short-term versioned store 104 is used to store writes (which may be to the whole of or a part of a chunk) when the system is operating in a lower gear and one or more chunk servers are unavailable (because the chunk server is in a low power state). A write (or each write) for a particular chunk has associated version information such that multiple writes for a portion of a chunk can be accommodated and the store 104 maintains substantially the same fault tolerance for data stored in the store compared to data stored in a chunk server, e.g. by storing r copies of a write in different locations within the store or by use of error correction techniques (e.g. erasure codes). The short-term versioned store may use the same coding used by the chunk stores (e.g. they may both use replication or erasure coding) or different coding may be used (e.g. the chunk stores may use erasure coding and the short-term versioned store may use replication). When all the chunk servers are available (e.g. when the system returns to the highest gear), data written to the store 104 is transferred to the chunk servers 102 (in a process which may be referred to as 'reclaim') and once this is completed, the data in the store can be deleted. This process is described in more detail below.

Although FIG. 1 shows the short-term versioned store 104 as a separate logical entity to the chunk servers 102, in some embodiments, the short-term versioned store may be co-located with a chunk server, as is described in more detail below with reference to FIG. 12.

The metadata service (MDS) 106 (which may be a centralized metadata service) functions as a naming service and maps an object to its constituent chunks. The metadata service 106 also records the location of replicas of a chunk (e.g. of each replica of a chunk), details of the primary and may also track chunk server availability. Other functions of the metadata service may include reassigning primaries as necessary and initiating recovery actions when a server fails permanently (as described in more detail below). The metadata service 106 is not on the data path between clients 108 and chunk servers 102 and the state of the metadata service is updated when chunks are created or deleted but does not need to be updated when they are read or written. In an example, the MDS may be implemented as an in-memory, deterministic state machine which can be replicated for high availability using state machine replication techniques.

The operation of the system of FIG. 1 in response to read and write requests received from a client 108 can be described with reference to FIG. 3. When a client 108 has a read or write request, the metadata service 106 is used to identify the relevant primary chunk server (or multiple primary chunk servers, where the request relates to multiple chunks), e.g. the chunk ID and primary chunk server location (block 302). The client 108 sends the read/write request to the primary chunk server (block 304) and in the case of a read request, the primary chunk server uses a local replica of the chunk to satisfy the request (block 306). In the case of a write request and where the system is operating in its highest gear, such that all the chunk servers storing replicas of the relevant chunk are available ('Yes' in block 308), all replicas of the chunk stored on the different chunk servers are updated with the write (block 310). If however, not all the chunk servers are available ('No' in block 308), i.e. the system is operating in a lower gear or a chunk server has failed, the write is written to the short-term versioned store 104 (block 312). This data written to the short-term versioned store (in block 312) is subsequently reclaimed and written to the chunk servers when they are all available and this is described in more detail below.

Availability of chunk servers may be tracked through periodic heartbeats sent from chunk servers 102 to the MDS 106. In response to a heartbeat, the MDS sends the chunk server a lease for the set of chunks that it is currently the primary for, and details of the locations of the secondaries for those chunks (i.e. details of the chunk servers which store the secondary replicas). Leases are set to expire before the MDS times out the heartbeat, and servers send fresh heartbeats before their leases expire. The MDS reassigns primaries on demand for chunks whose primaries have lost their lease. A chunk server with an expired lease will return an error to a client trying to access data on it; after a timeout period the client fetches and caches the new chunk metadata from the MDS.

There are many different ways in which the replicas of chunks may be assigned to chunk servers at chunk creation time. In a first approach, which may be referred to as 'naïve random layout', each replica of a new chunk is stored on a different server chosen at random and the selection of servers for one chunk is independent of the selection of servers for any other chunk. However, this layout makes it hard to power down more than r−1 servers in the entire system (where r is the number of replicas, as detailed above) and this limits the possible power savings which can be achieved.

Figure 4:
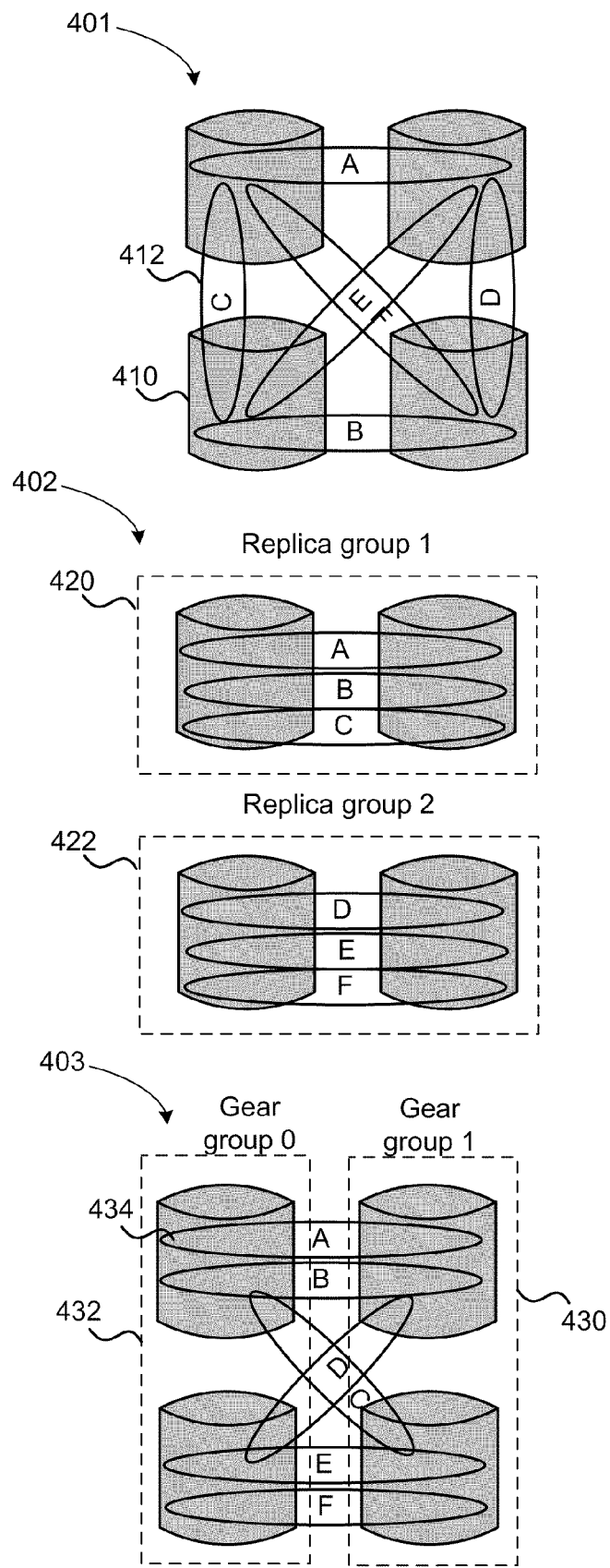
FIG. 4 shows a graphical representation of different server layouts within a storage system.

A first example 401 shown in FIG. 4 provides a simple graphical representation of the naïve random layout for 6 chunks (A, B, C, D, E, F), 4 servers 410 and 2 replicas of each chunk as indicated by ellipses 412. Since every chunk is 2-way replicated, considerable power saving can be achieved by putting 2 of 4 servers into standby (or other low power state) at low load and yet keeping one replica of each chunk available. However, with the layout shown in example 401, it is not possible to put more than one server into a low power state (as there is at least one chunk, A-F, for which both replicas would be unavailable if any two servers were placed into a low power state). As the size of the system increases, the random layout makes it increasingly improbable that more than r-g servers can be powered down while still keeping g active replicas of every chunk. Additionally, with this layout, finding a maximal set of servers that can be turned off without losing availability is likely to be computationally hard, since it is a special case of the NP-complete set covering problem.

An alternative approach, shown in example 402, is to put servers into groups 420, 422, which may, in the case of replication, be referred to as 'replica groups'. In an embodiment, each replica group comprises r chunk servers and in other embodiments, each replica group may comprise more than r chunk servers (e.g. a multiple of r chunk servers). A chunk is then assigned to one replica group rather than to r independently chosen servers (e.g. chunks A-C are assigned to replica group 1 in FIG. 4), i.e. the r replicas of a chunk are stored on different chunk servers within a particular replica group. In this case, it is possible to switch off r-g servers in each replica group (e.g. two servers in total in example 402) and still have g replicas of each object available.

Grouping of servers as shown in example 402 (which may be referred to as 'naïve grouping'), however, reduces the rebuild parallelism: when a server suffers a permanent failure, its entire contents have to be rebuilt (e.g. re-replicated) on a single new server, and this server becomes the bottleneck for the rebuild process. With a typical commodity disk with a write bandwidth of 80 MB/s and 1 TB of data, this would take 3.6 hours. With the naïve random approach (e.g. as shown in example 401) on the other hand, each chunk stored on the failed server can be independently rebuilt on any of the other servers in the system. This gives a high degree of rebuild parallelism, and hence a higher rebuild rate.

A further approach shown in example 403 uses a generalized notion of grouping that achieves both power savings and high rebuild parallelism by using power-aware grouping. Each server is assigned to exactly one of r gear groups 430, 432. For a chunk, one replica is stored in each gear group (e.g. for chunk A, one replica is stored in gear group 0 and one replica is stored in gear group 1, as indicated by ellipse 434), where selection of the server within each gear group to store the replica may be done substantially uniformly at random. Using this approach, the system can be put into any gear g by turning off r-g gear groups (e.g. in block 206 of FIG. 2) and if a server in some gear group G fails, then its data can be rebuilt in parallel on some/all remaining servers in G. Thus the rebuild parallelism is N/r where N is the total number of servers.

The following table shows, for the three approaches described above, the number of servers which can be powered down in a particular gear g (e.g. in block 206 of FIG. 2) and the write parallelism for data rebuild (as described above). As set out above, N is the total number of servers and r is the number of replicas of each chunk and may be referred to as the 'replication level' (in an embodiment which uses replication).

|  | Number of servers that can be powered down | Rebuild parallelism |
| --- | --- | --- |
| Naïve random (example 401) | $r-g$ | $N$ |
| Naïve grouping (example 402) | $N\dfrac{r-g}{r}$ | 1 |
| Power-aware grouping (example 403) | $N\dfrac{r-g}{r}$ | $\dfrac{N}{r}$ |

All three layouts (or approaches) are equivalent with respect to load balancing of client requests, since all three allow chunk replicas and primaries to be spread uniformly over servers.

Figure 5:
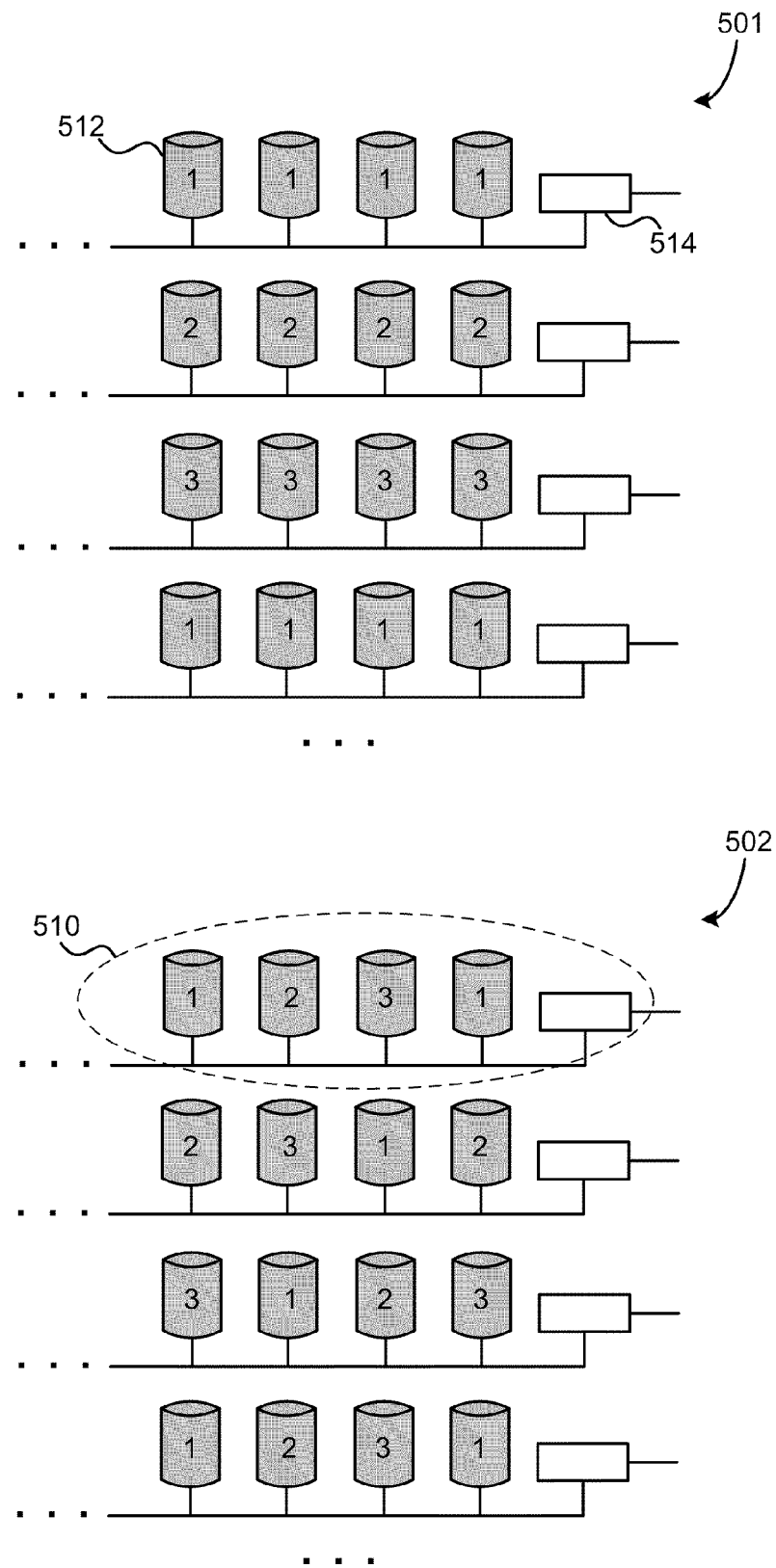
FIG. 5 is a schematic diagram showing two different replication strategies.

For each of the three layouts, the storage locations of replicas of a chunk may be further constrained such that different replicas are stored in different fault domains, e.g. different racks in the data center. This may increase the resilience of the system. In the case of replication, this technique of storing of replicas in different fault domains may be referred to as 'cross-rack replication'. Where cross-rack replication is used, the naïve random policy (example 401 in FIG. 4) still only enables r-g racks to be turned off or put into another low power state, rather than $$N\frac{r-g}{r}$$

servers (as enabled by the other two layouts described above). Similarly the naïve grouping layout (example 402) can only rebuild over one rack rather than $$\frac{1}{r}$$

of the racks as in power-aware grouping (example 403).

Where power-aware grouping with cross-rack replication is used, there are two variants: rack-aligned (example 501) and rotated (example 502), as shown in the schematic diagram of FIG. 5. FIG. 5 shows four different racks 510 in each example and a plurality of servers 512 in each rack. The number shown inside the cylinder representing a server 512 in FIG. 5 indicates the gear group to which the server belongs. While both variants allow the same number of servers to be turned off in a given gear, the location of the servers is different. In the rack-aligned case (example 501), all servers in a given rack belong to the same gear group and hence are in the same power state; this may allow some additional power savings, for example, by turning off rack-wide equipment such as switches 514. However, the rotated layout (shown in example 502) provides an even distribution of powered-up servers (and hence the thermal load) across racks independent of the gear that the system is currently operating in.

In a further variation of power-aware layout (example 403) described above, individual servers may be put into a low power state in addition to, or instead of, placing entire gear groups of servers into a low power state. This provides additional granularity in ensuring that the number of available servers match the system load (as described in more detail below) whilst minimizing the power consumption of the system. This may be referred to as 'partial gearing' or 'micro-gearing' and is shown in the schematic diagram in FIG. 6.

Figure 6:
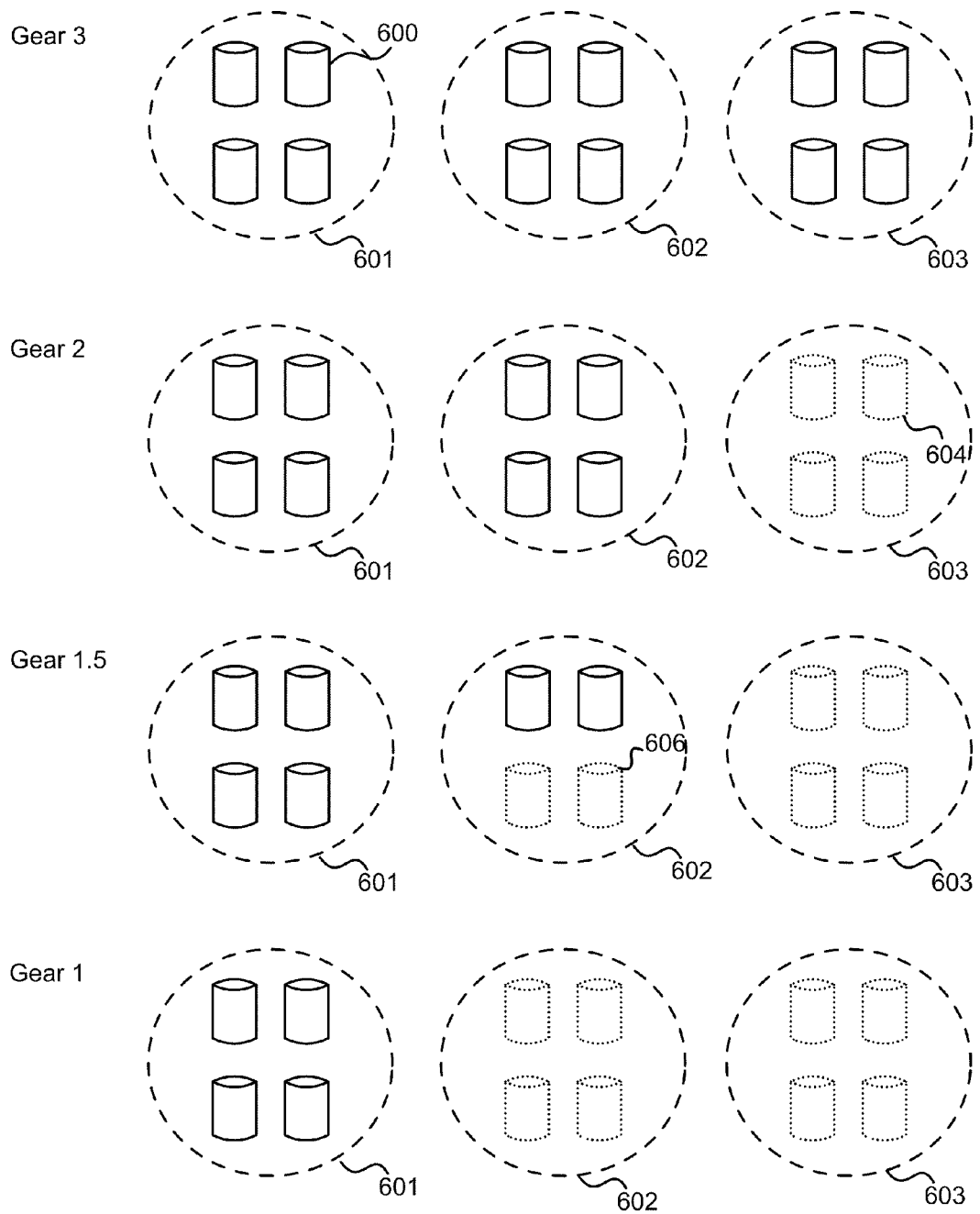
FIG. 6 is a schematic diagram showing different modes of operation of a storage system.

FIG. 6 shows a schematic diagram of chunk servers 600 grouped into three gear groups 601-603. In gear 3 (g=3), all three gear groups are available and all replicas of a chunk are active. In the lower gears (g<3), some of the chunk servers are in a low power state (as indicated by dotted outlines 604, 606 and e.g. as in block 206 of FIG. 2) and the number of active replicas of each chunk is reduced (as in block 204 of FIG. 2). Gear 1.5 is a partial gear, in that one entire gear group 603 is in a low power state and additionally, half of the servers in a second gear group (group 602) are in a low power state. This gear provides greater availability of data than gear 1; however the number of active replicas for a chunk will not be the same for all chunks (e.g. for those chunks having a replica stored on the two available servers in gear group 602, there will be two active replicas, one stored in gear group 601 and one stored in gear group 602, and for other chunks there will only be one active replica which is stored on a server in gear group 601).

Where partial gearing is used, the servers within a gear group that are put into a low power state may be selected substantially at random from all the servers within the group. Alternatively, other factors may be taken into consideration when selecting the servers, for example, servers with a historically lower I/O load (e.g. because the chunks stored on the server are less popular than chunks of data stored on other servers) may be selected in preference to servers with a higher I/O load (based on historical load data).

The switching of the storage system between gears may be controlled locally or may be controlled by a central entity (as described below with reference to FIG. 7). The switching may be based on any combination of historical and/or current system load data and this may be computed locally at each server or more centrally (e.g. for the entire storage system or individually for each gear group of servers). Where the switching is controlled locally, each server may check with the MDS prior to entering a low power state to ensure that sufficient servers remain available.

Many storage systems exhibit a 24-hour cycle in load and in such a situation, the storage system may change between gears on a time scale of hours, e.g. a few times a day in order to capture the broad diurnal patterns in load. In other examples, the changing between gears may occur on a different time scale and factors which affect the choice of time scale include the low power state (or states) used for the servers and the time taken for the server to return to normal power state from the low power state. For example, a server may take several minutes to start up from an off state, several seconds to come out of standby and it may only take a few seconds (e.g. 3 seconds) to spin up a disk of a server which has been spun down.

Figure 7:
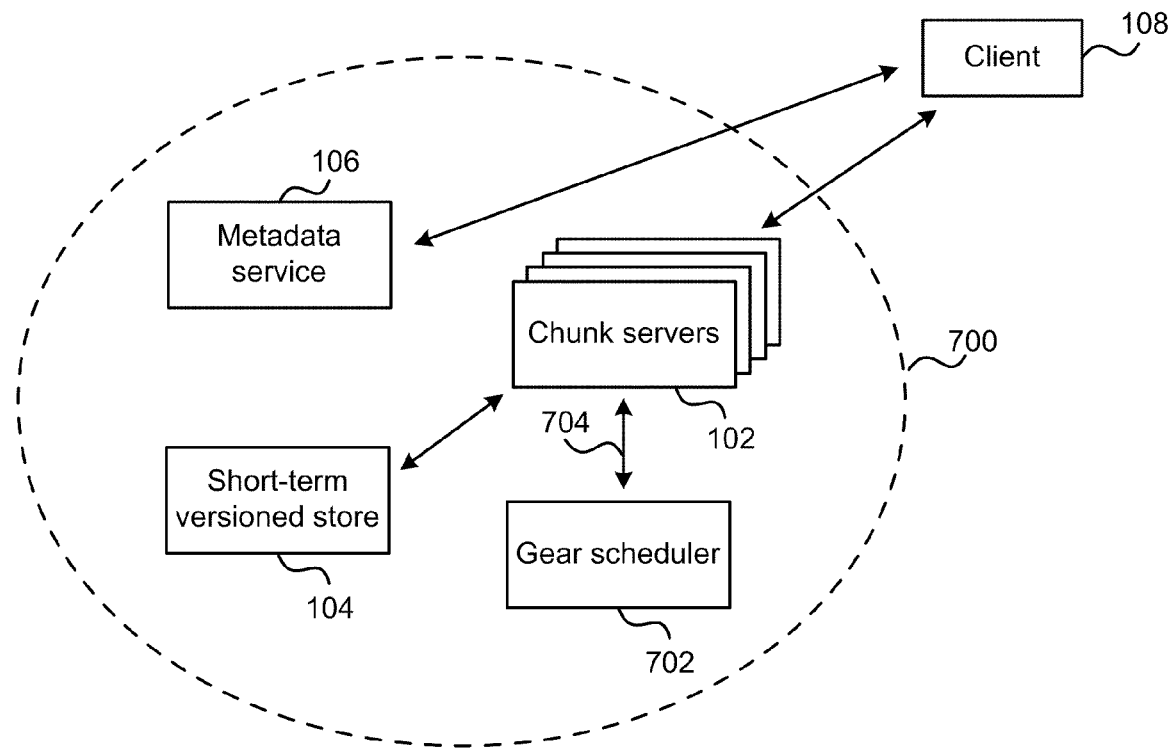
FIG. 7 is a schematic diagram of another storage system which is adapted to reduce its power consumption at times of low load.

FIG. 7 is a schematic diagram of another storage system 700 which is adapted to reduce its power consumption at times of low load and which, in addition to the elements shown in FIG. 1 and described above, comprises a gear scheduler 702. The gear scheduler collects and aggregates load statistics from the chunk servers 102 and provides the chunk servers with gear schedules, as indicated by arrow 704. These gear schedules, which may be periodically computed and pushed down to the servers, provide information to a server on when it should be in its normal power state and when it should enter a low power state. Where more than one low power state is used, the gear schedule may also specify which low power state a server should be in at a particular time. Having received a gear schedule from the gear scheduler 702, each server 102 follows its own gear schedule.

Although FIG. 7 shows the gear scheduler 702 as a separate entity from the metadata service 106, in some embodiments, these elements may be combined into a service which performs both a naming service (and potentially other functions of the MDS) and a gear scheduling service. Furthermore, although FIG. 7 shows a single gear scheduler, in some embodiments there may be multiple gear schedulers and at any time one may be operational or alternatively, the scheduling operation may be distributed across multiple gear schedulers.

In an embodiment, the load metric used by the gear scheduler 702 uses the rate of reads and of writes, both aggregated over all the chunk servers 702; the write rate is weighted by a factor r, since each write is replicated r times. In this embodiment the gear scheduler also considers separately the random-access I/O rate measured in IOPS, and the streaming I/O rate measured in MB/s. Given the known performance per chunk server in terms of IOPS and MB/s, the load, L, can then be computed in units of the number of chunk servers required to sustain the load.

$$L_{nonseq} = \frac{TotalIOPS_{read}}{ServerIOPS_{read}} + r \cdot \frac{TotalIOPS_{write}}{ServerIOPS_{write}}$$

$$L_{seq} = \frac{TotalMBPS_{read}}{ServerMBPS_{read}} + r \cdot \frac{TotalMBPS_{write}}{ServerMBPS_{write}}$$

$$L = \max(L_{nonseq}, L_{seq})$$

In an example, the load is measured at 1 second intervals on each chunk server, and aggregated once an hour. The peak (i.e. maximum) load observed in the hour may be used as the load for that hour. Alternatively the mean value may be used; however since I/O load is often bursty using the mean value may degrade performance during bursts. The gear scheduler then predicts the load for each hour of the following day, by averaging the past load samples for that hour in previous days.

In this example, to compute the gear g for a given hour, the gear scheduler measures whether the predicted load for that hour exceeds $$\frac{1}{r}, \frac{2}{r},$$

etc of the total number of chunk servers N. It then chooses the lowest gear which leaves enough servers active to sustain the load:

$$g = \left\lceil \frac{L}{N} r \right\rceil$$

Where micro-gearing is used, the gear g is not limited to integer values (but the number of active servers gN would be an integer) and instead the following equation may be used:

$$g = \frac{\lceil Lr \rceil}{N}$$

For any given gear g, the servers in the first r-g gear groups may be scheduled to be powered down for the particular given hour (or other time period). The gear schedules are then pushed to the chunk servers, and each server follows its own gear schedule. Over several days, the gear scheduler rotates the ordering of the gear groups (as used when selecting the first r-g gear groups to power down), so that in the long term all servers spend an equal amount of time powered up. This allows all servers to do background maintenance tasks, e.g. scrubbing, during idle periods.

Experimental results using the load prediction algorithms described above show that for sample email and instant messenger data the error in selecting a gear is low even after one day of training. Using 6 days of data for training and one day of data for testing showed that for email all the gears were correct, for instant messenger 90% of the gears were correct and for a small enterprise, 75% of the gears were correct.

It will be appreciated that the above description describes just one example of a possible way of calculating the load and gear for a particular unit of time (e.g. an hour in the examples above). Other time periods and/or other methods may alternatively be used and these may, in some examples, use a combination of historical data and current load data (e.g. instantaneous I/O load data).

As described above, the storage system balances load by spreading primaries uniformly across active servers, and hence across active gear groups. This means that when servers in some gear group G are powered down or enter another low power state (e.g. in block 206 of FIG. 2), any chunk primaries on those servers would become unavailable, and clients would not be able to access those chunks. Where a heartbeat mechanism is used to track availability of servers (as described above) and handle server failures (as described below), the situation when a server holding a primary replica of a chunk enters a low power state could be treated in the same way as a failure. In such an instance, the MDS will reassign the primaries when it detects a failure. However, this will result in data being unavailable until the "failed" server's leases expire. In another embodiment, the chunk servers may pro-actively migrate all chunk primaries onto other replicas (which are stored on servers which are not entering a low power state) before entering a low power state (such as powering down), using a migration protocol such as the one shown in FIG. 8.

Figure 8:
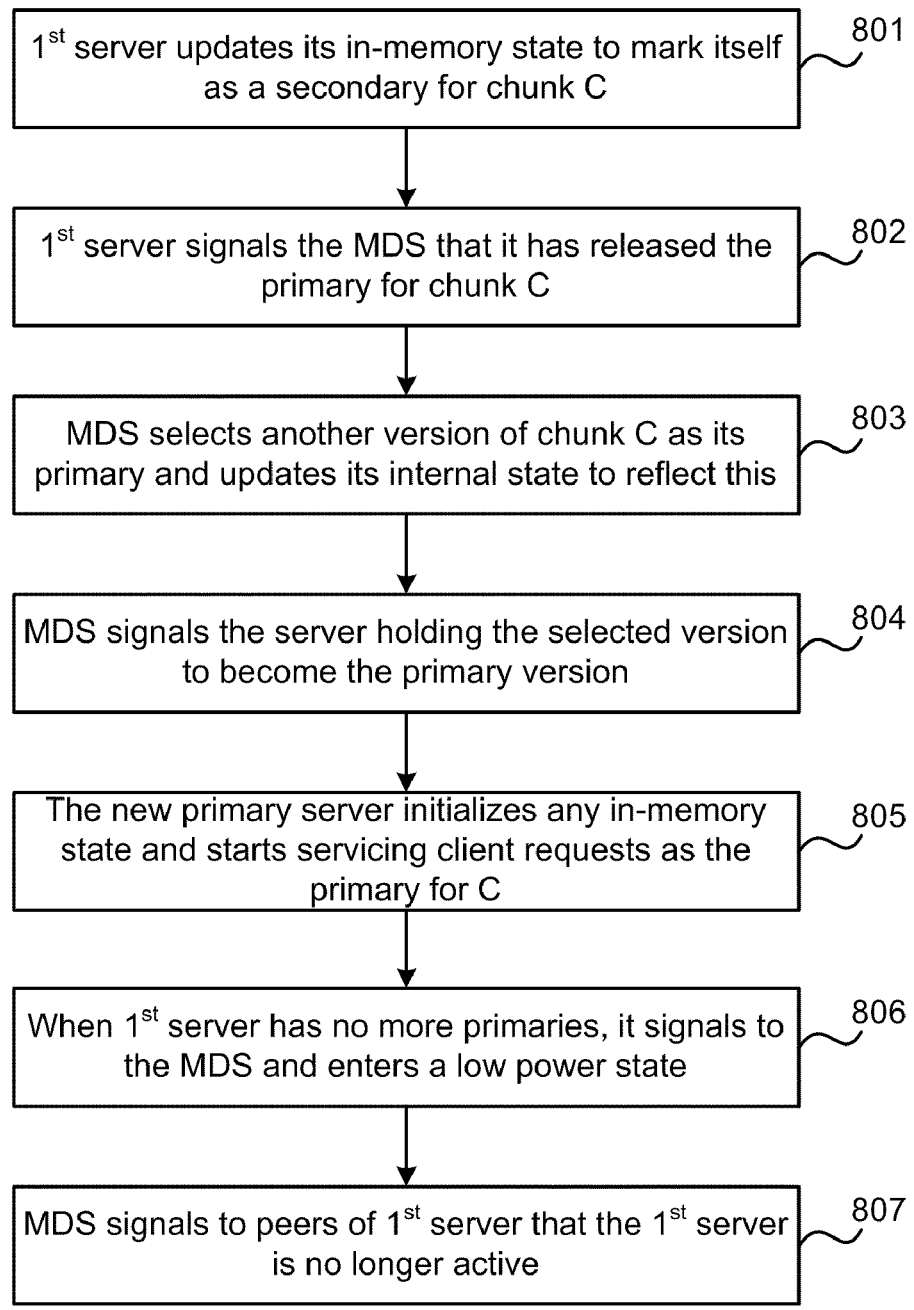
FIG. 8 shows a flow diagram of an example primary migration protocol.

FIG. 8 shows a flow diagram of an example primary migration protocol. In this example, if a server S wishes to enter a low power state (e.g. if it is scheduled to enter a low power state according to the schedule received from the gear scheduler), it executes the following protocol for each chunk C for which S is a primary:

S updates its in-memory state to mark itself as a secondary for chunk C (block 801). An error will be returned on future client requests. Client requests currently in flight will complete normally;

S signals the MDS with released_primary(C) (block 802);

The MDS randomly picks another replica S' of the chunk C as its primary and modifies its internal state to reflect this (block 803);

The MDS signals S' with become_primary(C) (block 804); and

S' initializes any required in-memory state and starts servicing client requests as the primary for C (block 805).

Using this protocol, the window of unavailability for chunk C is one network round trip plus the time required to update MDS state and initialize the new primary on S'. If a client accesses C during this short window it will retry the operation first by obtaining the new metadata from the MDS. This protocol converts this temporary unavailability into a higher latency.

When the chunk server S has no more primaries or outstanding requests, it sends a message (e.g. a final "standby" message) to the MDS and goes into a low power state, e.g. into standby (block 806). In some embodiments, the MDS then sends 'gear shift' messages to all the peers of S (e.g. in the case of replication these are servers which share one or more replicated chunk with S) to inform them that S is no longer active (block 807). This is an optimization that avoids peers of S timing out on requests to S when accessing it as a secondary.

When a chunk server S wakes up from a low power state, such as standby, it communicates with the MDS (e.g. it resumes sending heartbeats to the MDS). When the MDS receives a communication (such as a heartbeat) from a server that was previously in a low power state, it may rebalance the load on the system by moving some primaries from other servers to S. This may be done by sending S a list of chunk IDs to acquire primary ownership for and details of the current primary for each chunk. In an embodiment, S may then contact the current primary chunk servers for each of the chunks on the list and each existing primary chunk server may then initiate a primary migration protocol similar to the protocol described above. In another embodiment, the MDS may contact each of the current primary chunk servers for the chunks on the list and cause them to initiate a primary migration protocol similar to that described above.

In another optimization, the chunks may be collected into chunk groups to reduce the number of MDS operations involved in primary migration. All chunks in a chunk group are replicated on the same servers, and have the same primary at any given time. Migration of primaries therefore requires one MDS operation per chunk group rather than per chunk. Chunks may be assigned randomly to chunk groups on creation. The number of chunk groups is a system parameter that trades off MDS load for fine-grained load balancing across servers. In an example, a storage system may use 64N chunk groups where N is the total number of chunk servers.

Figure 3:
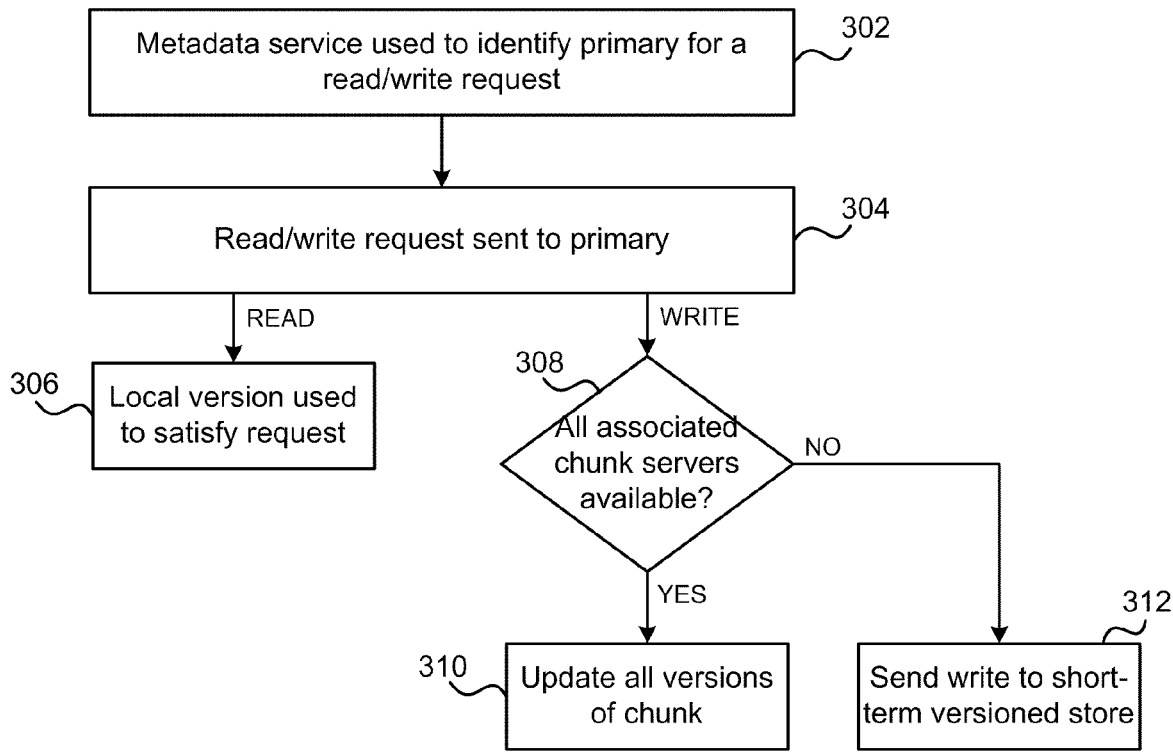

The systems 100, 700 comprise a versioned store 104 which is used so that writes are stored persistently and consistently even when one or more chunk replicas are unavailable (e.g. because the server on which they are stored is in a low power state), as shown in block 312 of FIG. 3. An example method of operation of the versioned store is now described in more detail below.

When one or more secondaries (i.e. servers storing secondary replicas of a chunk) is unavailable (e.g. powered down), a primary (i.e. a server which holds a primary replica of a chunk) enters 'logging mode'. In this mode it sends writes to the short-term versioned store instead of the secondaries (as shown in FIG. 3). When all secondaries are available again, the primary starts reclaiming the writes: data is read from the versioned store, written to all replicas, and then deleted from the versioned store.

Although the short-term store may share disk resources with the existing storage, i.e., the chunk servers, it is logically a separate service. Versions are used in the short-term store to ensure that the state visible to clients is consistent and recoverable. The chunk servers on the other hand are designed to run on standard file systems such as NTFS or ext3, which do not support versioning.

In an embodiment, a separate implementation may be used for the short-term store which allows it to be optimized for the write-dominated workload and the relative short lifetime of stored data items. In this embodiment, the short-term store uses a log-structured disk layout which is similar to that described in US patent application, publication number 2009/0249001 which is incorporated herein by reference in its entirety.

Figure 9:
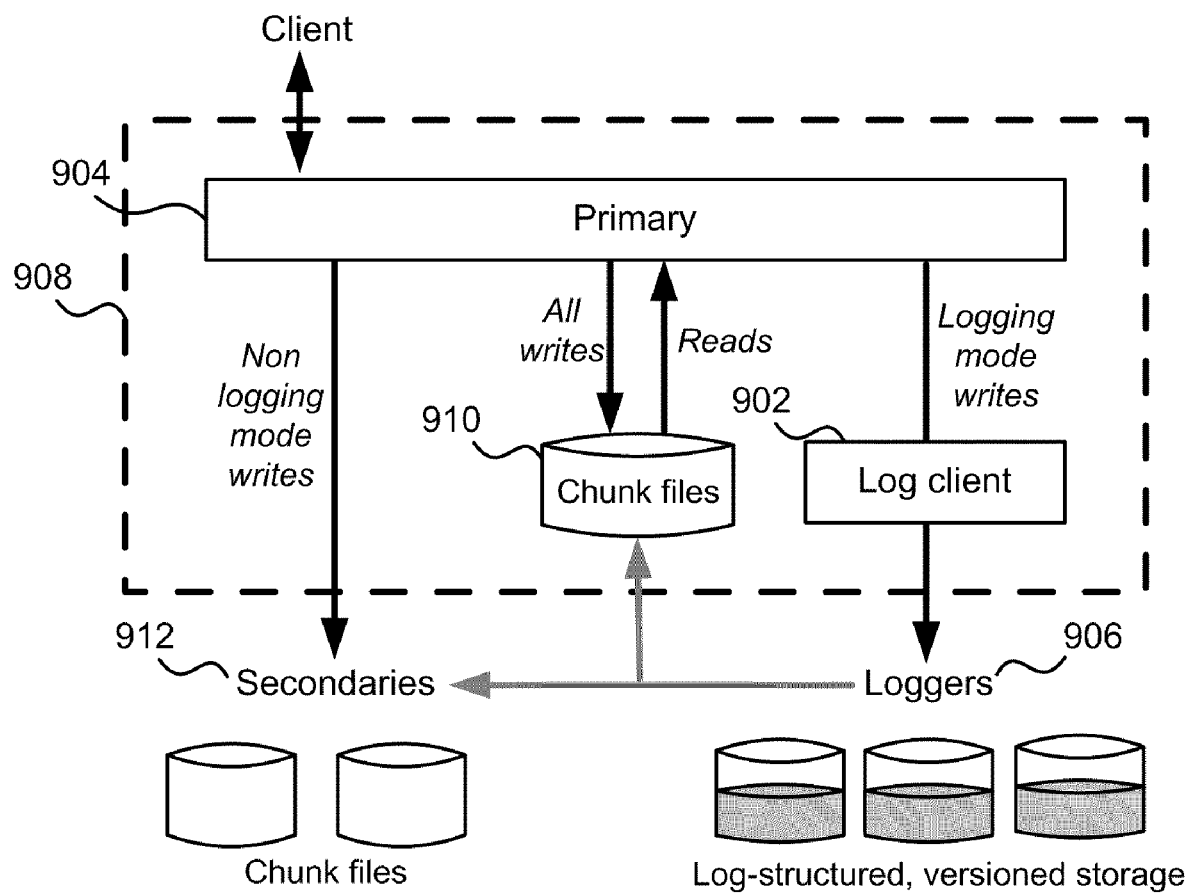
FIG. 9 is a schematic diagram of a chunk server primary and the logging and data reclaim paths.

The short-term store has two components: a log client 902 that is associated with each primary 904, and loggers 906 which send writes to a local on-disk log file. These elements are shown in FIG. 9 which also shows the logging and reclaim data paths from the point of view of a single chunk server primary. The dotted outline 908 represents a single chunk server acting as a primary. When not in logging mode, writes are written locally (i.e. to chunk files 910) and also sent to the secondaries 912 (as shown in block 308 of FIG. 3) and reads are satisfied from the locally stored data 910. In some embodiments, however, if a particular chunk is being read with very high volume, the primary may send some requests to a secondary instead of servicing them locally (not shown in FIGS. 3 and 9).

When in logging mode, the log client 902 sends each write to r loggers 906 and a number of different policies may be used for choosing the loggers to write to (and the loggers to reclaim from, as described below) and this is described in more detail below. Where cross-rack replication is used for the chunk data, these r loggers may be located in r different racks so as to maintain the same fault-tolerance properties as the chunk data. Log clients track the location and version of logged data in memory; this state can be reconstructed from the loggers after a failure.

Figure 10:
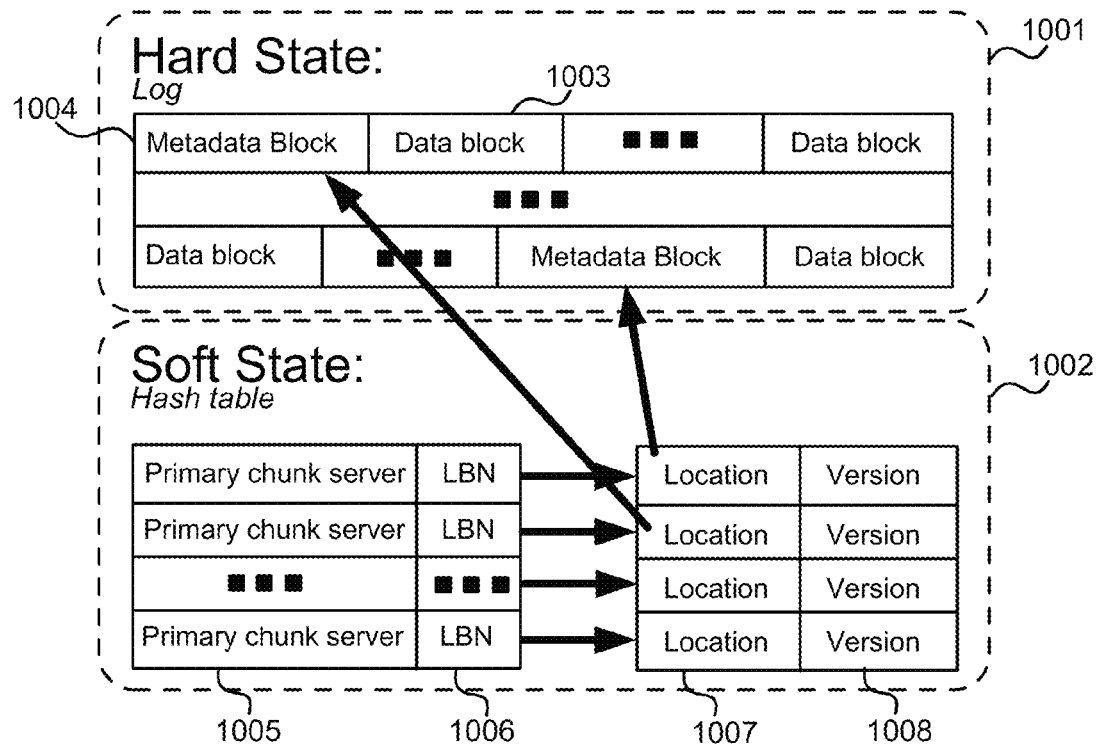
FIG. 10 shows representations of data structures maintained at a logger and a log client.
Figure 10:
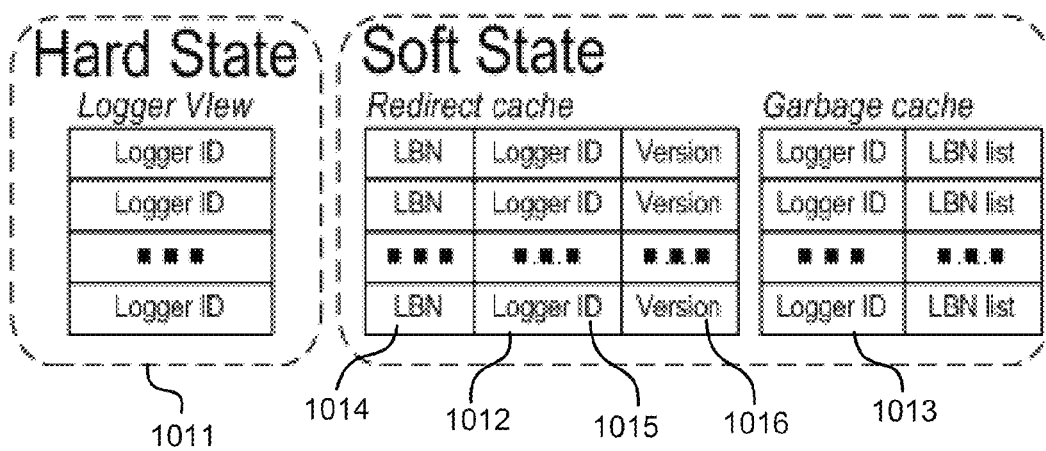

FIG. 10 shows representations of two data structures 1001, 1002 which, in an embodiment, are maintained at the logger 906. The hard state 1001, which is maintained persistently, comprises the stored writes (data blocks 1003) and associated metadata 1004. The metadata 1004 may comprise the identity of the log client from which the write was received, a range of logical block numbers (LBNs) and a version number. In one embodiment, the hard state 1001 may comprise pairs of a data block 1003 and associated metadata 1004. Such a logger may be based on the idea of fixed-size log records, with a fixed proportion allocated for metadata. However this requires prefetching log records and keeping them in memory, and this may result in a bottleneck when there are large numbers of concurrent I/Os. Alternatively one metadata element 1004 may relate to more than one data block 1003. Such a logger is based on variable-size log records (which may be in units of 512-byte blocks), each with a metadata block followed by data blocks if any. The hard state 1001 also comprises a header block (not shown in FIG. 10) which stores data about the log.

The soft state 1002, which may be cached in main memory, comprises details of the LBNs 1006 stored for each log client (or primary chunk server) 1005, their location 1007 and version 1008. Whilst the hard state 1001 may comprise multiple versions of the same block, some of which are 'stale' (i.e. marked as invalid but not yet deleted), the soft state 1002 does not include details of stale versions but comprises a list of the most recent version of any block stored for a log client. The soft state enables a logger to find blocks quickly within the hard state when a request is received from a log client. If the soft state is lost due to failure or shutdown, it can be recreated from the hard state. In some embodiments only a hard state 1001 may be maintained at the logger; however where a soft state is maintained, read and reclaim requests can be serviced more quickly. In an embodiment, the hard state 1001 may comprise a circular on-disk log 600, as shown in FIG. 6 of US patent application, publication number 2009/0249001.

The log client 902 controls the storage of writes by loggers when in logging mode and the subsequent reclaiming of the data. It is also responsible for ensuring consistency and performing failure recovery. To achieve this, each log client maintains persistently the identities of a set of loggers with which it interacts, and in an embodiment this may be referred to as the logger view 1011, as shown in FIG. 10. The number of loggers in the logger view may vary between log clients or may be fixed. Having a large number of loggers provides log clients with more options, particularly where a number of them may be in a low power state; however, if data is spread among a large number of loggers, the log client requires more loggers to be active to enable data to be reclaimed. In such an embodiment, the log client also maintains two in-memory data structures 1012, 1013. The data structure 1011 which is stored persistently may also be referred to as the hard state and the in-memory data structures 1012, 1013 may be referred to collectively as the soft state.

The redirect cache 1012 stores, for each write written to a logger, the relevant LBN 1014, the identity of the logger storing the current data for the write 1015 and the corresponding version number 1016. Version numbers are unique monotonically increasing values (e.g. 64-bit quantities), which ensure that the log client can identify the last written version of any data during failure recovery. The redirect cache 1012 may also comprise a one-bit "local" flag (not shown in FIG. 10) which identifies that the latest version is already stored on the primary and secondary chunk servers, but that the copy in the short-term versioned store has not yet been invalidated by the logger. The garbage cache 1013 stores the location of old versions of data. In the background, the log client sends invalidation requests for these versions; when these are committed by the logger they are removed from the garbage cache. Before invalidating the latest version of any block, the log client checks first that (a) the data from this latest version has been written to the primary and secondary chunk servers (e.g. that the 'local' flag is set) and (b) all older versions on other loggers than the one holding the latest version have been invalidated and acknowledged to be so.

Figure 11:
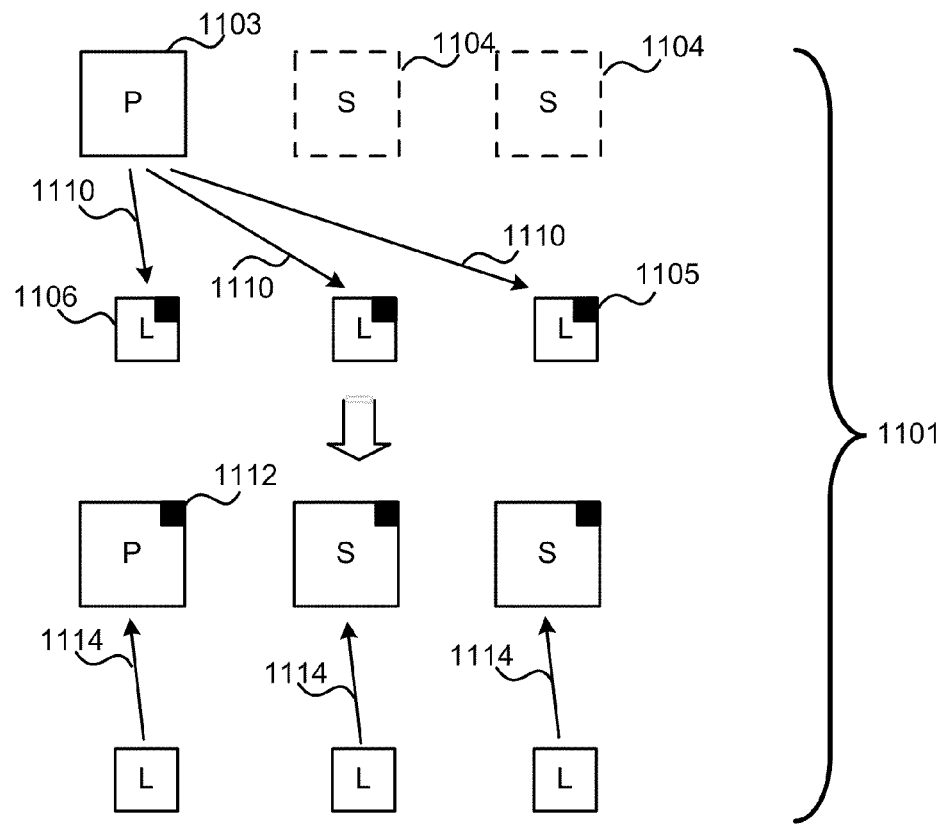
FIG. 11 is a schematic diagram showing two examples of the logging and reclaim process.
Figure 11:
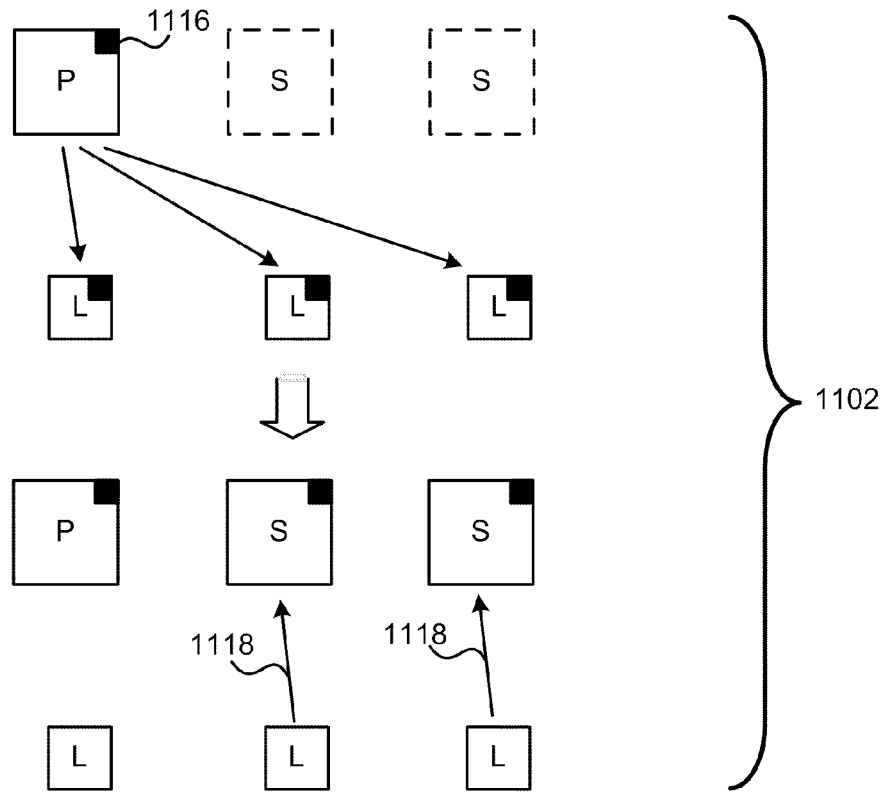

FIG. 11 shows a schematic diagram of two examples 1101, 1102, of the logging and reclaim process. In the first example 1101, when one or more secondaries 1104 are unavailable (as indicated by the dotted outlines in FIG. 11), the primary 1103 enters logging mode and writes 1105 are written to each of r loggers 1106 by the primary's associated log client (as indicated by arrows 1110). When in logging mode, reads to the new written data 1105 are serviced by a logger (e.g. the logger which is closest to the primary). Subsequently, when all secondaries 1104 are available (as indicated by the solid outlines), data is read from the versioned store, written to all replicas (data 1112 and as indicated by arrows 1114), and then deleted from the versioned store.

The reclaim may be performed as a background process (although it may be given a higher priority in some fault conditions, as described below). In some examples, such as where there is no support for native background (low priority) I/O in the operating system, the reclaim rate may be limited in some way (e.g. to 3.4 MB/s). Whilst limiting the reclaim rate reduces the probability of the reclaim process causing a performance degradation in the system (e.g. due to bottlenecks in the network between servers), in some embodiments, the reclaim rate may in addition (or alternatively) be specified such that the amount of logged data does not increase over a defined time period (e.g. over a day).

When sending writes to the versioned store (i.e. in logging mode), the primary may also write them to the local replica 1116 (i.e. to chunk files 910), as shown in the second example 1102 in FIG. 11. This allows reads (whilst in logging mode and for data which has been written whilst in logging mode) to be served from the local replica instead of from the versioned store and thereby reduces the load on the versioned store. It also avoids rewriting this cached data to the primary during reclaim (where the reclaim process is represented by arrows 1118). The metadata that tracks these locally cached writes is kept in memory, is small, but is not recoverable. Thus, if the primary fails or migrates to another server before the data has been reclaimed this cached data will be overwritten during the reclaim process (e.g. the reclaim process will be as shown in example 1101 rather than example 1102). In all cases correctness is maintained, with data being read from the loggers, if necessary, to service a client read.

In a further optimization (not shown in FIG. 11), when sending writes to the versioned store, the primary may, addition to writing the writes to a local replica (as in example 1102 of FIG. 11), write them to any available secondaries. This further reduces the number of steps that are required to complete reclaim when all the secondaries are available; however, as described above, if the primary fails or migrates to another server before the data has been reclaimed, the knowledge that the write has been written to a particular secondary will be lost and the data will be overwritten during the reclaim process (e.g. the reclaim process will be as shown in example 1101 of FIG. 11).

The optimizations shown in the second example of FIG. 11 and described above effectively perform a part of the reclaim process (e.g. writing the write to the primary and possibly any available secondaries) ahead of all the secondaries being available and this process may be referred to as 'pre-claim'. However, the final step of the reclaim process, which comprises deleting the data stored in the logger, is always delayed until after all the secondaries are available and after it has been confirmed that the write has been written back to the primary and each secondary.

Although in the above description, the pre-claim process occurs when the write is received by the primary, in other examples, the pre-claim process may occur after the write has been written to the versioned store but before all the secondaries are available and this may occur as a background process. This is less efficient than performing the pre-claim when processing the write request as it requires the data to first be read by the primary chunk server from the versioned store.

It will be appreciated that although FIG. 11 shows the reclaim process occurring such that each logger 1106 transfers data to a different one of the secondaries 1104 and primary 1103 (as indicated by arrows 1114 and 1118), in some embodiments only one logger may be used in the reclaim process. In such an embodiment, the primary 1103 reads from the logger which is closest to the primary (e.g. either co-located or on the same rack) and then writes the data to each of the secondaries. In another embodiment, where there is a local replica 1116, the data may not be read from any loggers during reclaim but instead the local replica of the write may be copied to each of the secondaries by the primary. In an example, this embodiment may be used when the coding used by the short-term versioned store is different from that used by the chunk store (e.g. the chunks may be replicated but the loggers may be erasure coded, or vice versa).

Figure 12:
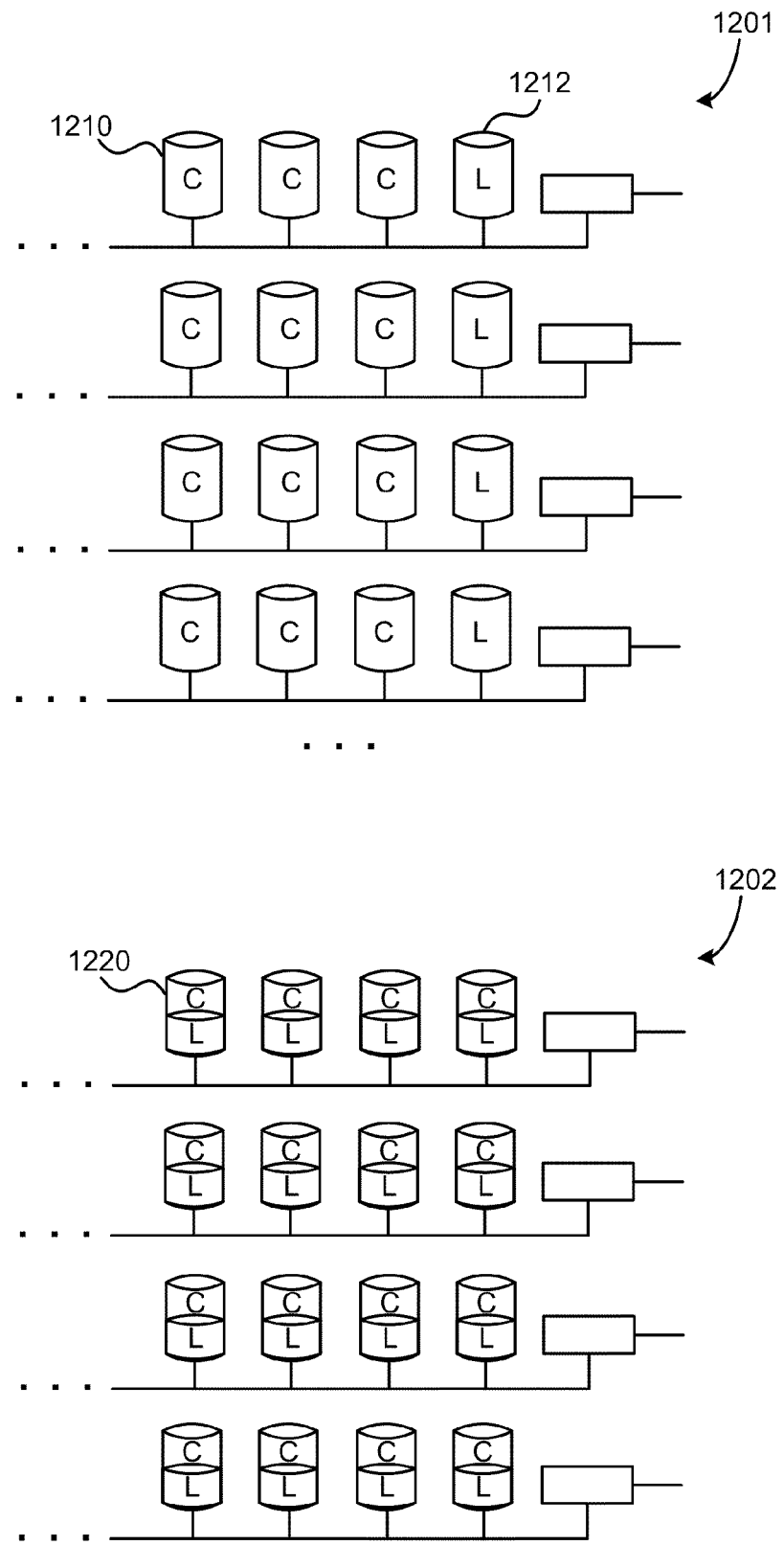
FIG. 12 is a schematic diagram of two different ways of configuring loggers and chunk servers.

Loggers can be run on dedicated servers or can be co-located with chunk servers, as shown in FIG. 12. FIG. 12 shows two examples of ways of configuring loggers (L) and chunk servers (C): a dedicated configuration 1201 and a co-located configuration 1202. The dedicated configuration 1201 comprises servers which are configured as either a chunk server 1210 or a logger 1212, whilst the co-located configuration comprises servers 1220 which operate as both a chunk server and a logger. The dedicated configuration minimizes contention between the chunk server workload and the logger workload and allows the loggers to service mostly writes, for which they can be optimized. The dedicated configuration does, however, require a small amount of additional resources, e.g. one dedicated logger per 20 chunk servers in a rack and as a result the co-located configuration 1202 provides more opportunity for power savings.

For each logging mode write, the log client can choose any r available loggers, and where cross-rack replication is used for the chunks themselves, these r available loggers may also be selected such that they are on different racks. There are many factors which may influence the selection of loggers, such as disk load, network overheads (e.g. minimization of these overheads), proximity and cross-rack network bandwidth (which may be scarce and as a result may be minimized). If the co-located configuration 1202 is used, one of the loggers selected may be co-located with a chunk server in the lowest gear group, so that the logged data is always available to service a read request. In an embodiment, the loggers may be selected according to the following methodology: for every log write, the log client for a chunk group G sorts the loggers in its logger view in the following order:

1. Loggers on the same server as a replica of G,
2. Loggers in the same rack as a replica of G,
3. Loggers in other racks.

Within each of these groups, loggers are sorted by disk load. For each log write the log client chooses the first r loggers that are in different racks.

As described above, the storage system may use techniques such as heartbeats and primary reassignment to maintain read availability during transient errors and additionally it uses the short-term versioned store to maintain write availability. The following paragraphs describe further optimizations which may be implemented to handle failure modes resulting from gearshifting (i.e. changing between gears). These optimizations may be implemented in any combination or independently.

A first technique addresses failures of chunk servers when in low gear (i.e. when some of the chunk servers are already in a low power state). When the MDS detects failure of a chunk server S, it wakes up all the servers that share any chunks with S (these servers may be referred to as peers of S). Since waking up from standby typically takes a few seconds, and even powering up a machine (from an off state) can be done in minutes, this does not significantly increase the window of vulnerability for a second and third failure. However, when the system is already in gear 1, failure of a server can cause the last active replica of a chunk to become unavailable while servers holding other replicas are being woken up. This may result in a large latency penalty for any client accessing the chunk during this window. As described above, the gear scheduler takes the minimum gear level $g_{min}$ as a policy input and the value of this parameter depends on, amongst other things, the desired trade-off between power savings and the risk of temporary unavailability on failure. In an example of a 3-way replicated system, $g_{min}$ may be 1 (for higher power savings) or 2 (for higher availability). Having $g_{min}=3$ will not save any power.

A second technique addresses failure of loggers (i.e. failure of logger servers). When a server fails, the log data stored on the failed server becomes unavailable; however, other replicas of each log record are still available on other servers (e.g. two other replicas for a three-way replicated system). Thus, logged data has the same level of fault tolerance as unlogged data. One option to maintain this fault tolerance is to re-replicate data within the logging service on failure. However, since the data will eventually be reclaimed back to the replicas stored on the chunk servers, it may be more efficient for the primaries to reclaim at high priority any at-risk data, i.e. logged data with fewer than the specified number of available replicas (e.g. with fewer than three available replicas in a three-way replicated system). At the end of the reclaim, the data will be no longer on the loggers but multiple replicas will be stored on chunk servers (e.g. in the three-way replicated system, the data will be three-way replicated across the chunk servers).

Where loggers and chunk servers are co-located (e.g. as in example 1202 of FIG. 12), the failure of a server will result in the failure of both a logger and a chunk server. In such an instance, both the first and second techniques described above may be implemented substantially in parallel or serially.

A third technique addresses permanent failures in low gear. On a permanent failure, the MDS initiates the rebuild of data stored on the failed server; this requires peers of the failed server to be powered up to participate in the rebuild. As described above in the first technique, the peers of a server S may already be woken up whenever a transient failure is suspected on S. Hence the time to wake up the peers is overlapped with the detection of permanent failure. As the time to transfer the data to new replicas is likely to dominate the total recovery time, waking up machines (even if they are in standby) does not significantly increase the window of vulnerability to a second permanent failure.

In a primary/backup replication system such as described herein, it is possible for a server failure during a write request to result in replica divergence, with some replicas having applied the write and others not. If an update failure occurs, the primary chunk server reacts by re-sending the update to the versioned store. The versioned store avoids replica divergence by using explicit versions. If the primary fails, then the client will retry the request, and the new primary will send the update to the versioned store. However, if both the primary and the client fail while a write request is in flight, then replica divergence is possible and this may be addressed in some embodiments by using chain replication, where updates are applied serially to the replicas rather than in parallel. Chain replication prevents replica divergence at the cost of higher update latencies.

The systems and techniques described above can be used with clusters of commodity servers as chunk servers and/or loggers where server failure is relatively common. Through the use of the short-term versioned store and fault recovery mechanisms, the system is able to maintain the data despite server failures.

Figure 13:
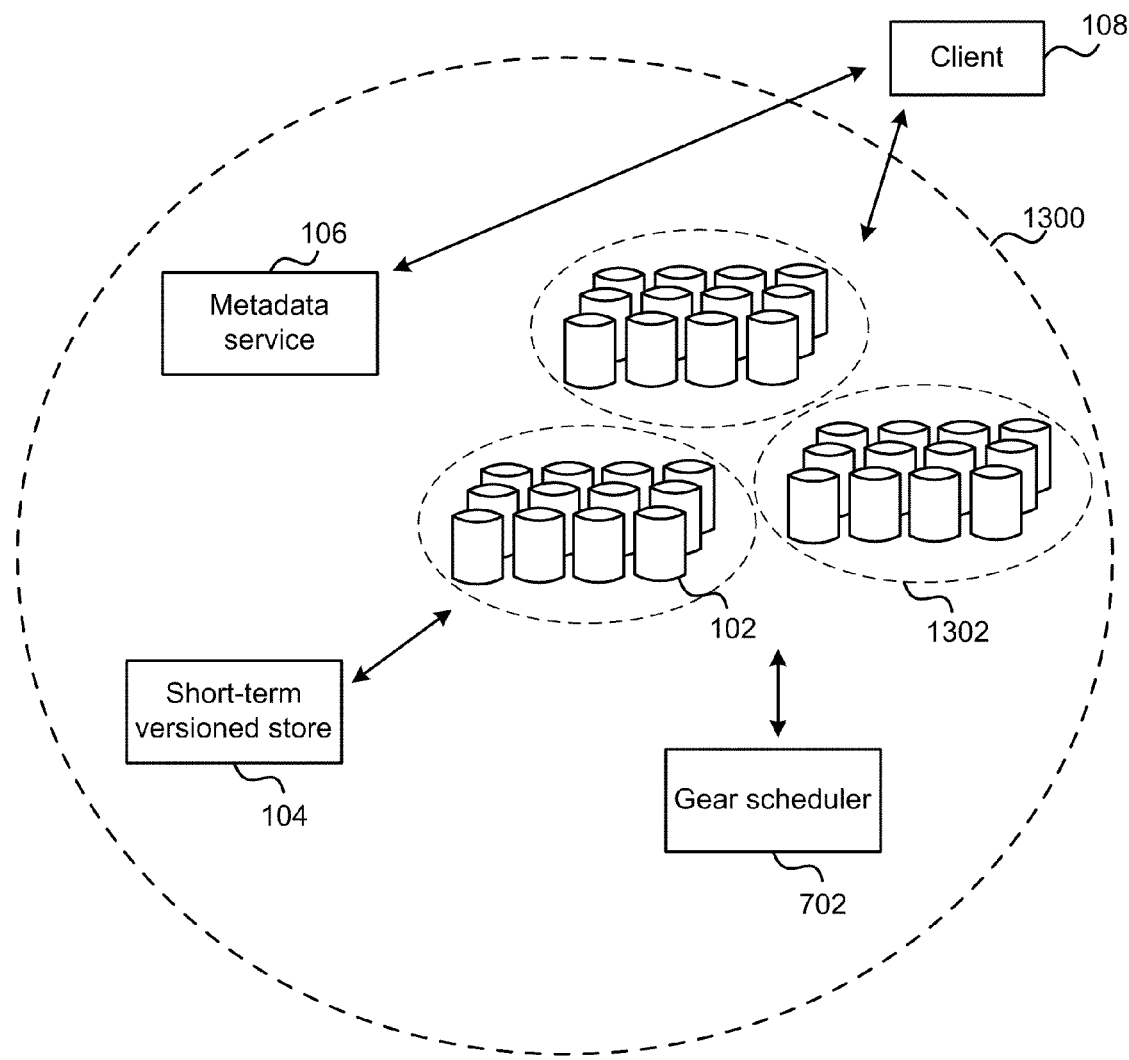
FIG. 13 is a schematic diagram of a further storage system which is adapted to reduce its power consumption at times of low load.

FIG. 13 is a schematic diagram of a further storage system 1300 which is adapted to reduce its power consumption at times of low load. In this system, the chunk servers 102 are grouped into non-overlapping domains 1302, which may be referred to as 'replication domains'. Within each domain 1302 the servers may be grouped using power-aware grouping (as shown in example 403 of FIG. 4) or any other grouping. Additionally, within each domain different system parameters may be set, such as the number of replicas/fragments stored, r, (which is also equal to the number of gear groups in the domain), the minimum gear, $g_{min}$, etc. In some embodiments, a domain may use replication and another domain may use erasure coding, and/or different domains may use different replication or erasure coding schemes (e.g. different domains may be able to accommodate different numbers of failures).

At chunk creation, a chunk may be assigned to a domain (and may also be assigned to a chunk group and/or a replica group, as described above). Where different domains have different parameters, a chunk may be assigned to a particular domain according to properties of the data, such as its importance, sensitivity, popularity etc. In an embodiment, the size of a domain (i.e. the number of servers within the domain) may be selected such that the rebuild rate is sufficiently high (e.g. with a small number of servers within a domain, the rebuild rate is lower than for a domain comprising a larger number of servers).

Use of domains within a storage system isolates the effects of a failure to within the particular domain and additionally may be used to accommodate different system parameters, as described above. Domains may alternatively, or additionally, be used to accommodate non-homogeneous hardware (e.g. by grouping similar hardware within a domain), for security reasons and/or for ease of administration. Although FIG. 13 shows a single versioned store 104 and a single gear scheduler 702 which are shared between all domains 1302, it will be appreciated that the versioned store and/or gear scheduler may be replicated within each domain or there may be more than one versioned store and/or gear scheduler, with each versioned store and/or gear scheduler being associated with a subset of the domains (e.g. one gear scheduler and/or one versioned store for a pair of domains). In another embodiment, the versioned store 104 may be partitioned into logical domains and this may be utilized independently of whether the chunk servers are grouped into domains. Additionally, in a further example system, a gear scheduler 702 may not be provided (e.g. as shown in FIG. 1) and the scheduling may be performed locally by chunk servers.

Figure 14:
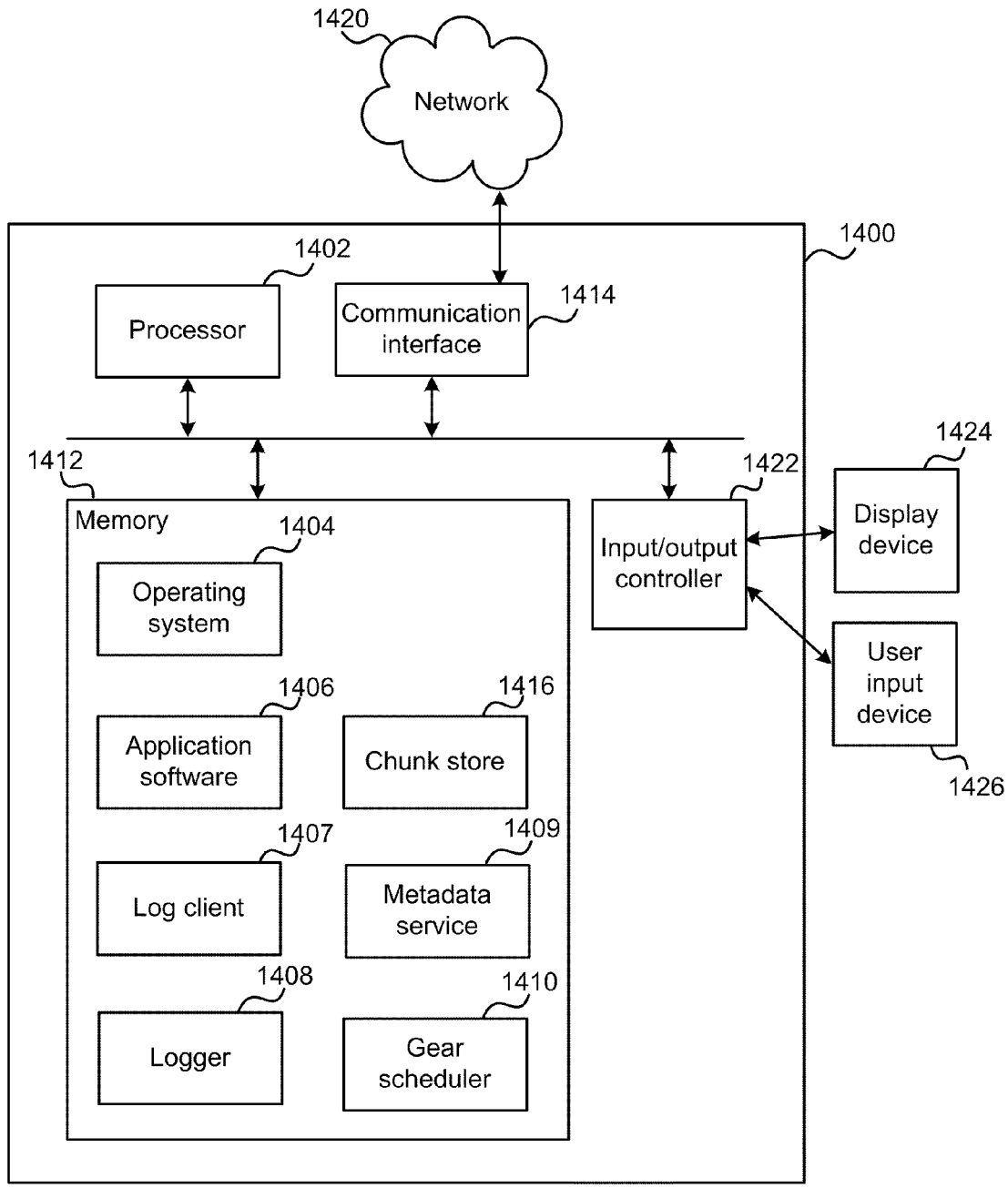
FIG. 14 illustrates an exemplary computing-based device in which embodiments of the methods described herein may be implemented.

FIG. 14 illustrates various components of an exemplary computing-based device 1400 which may be implemented as any form of a computing and/or electronic device, and in which embodiments of the methods described herein may be implemented. The computing-based device may, for example, operate as a chunk server, a gear scheduler, a metadata service and/or a logger.

Computing-based device 1400 comprises one or more processors 1402 which may be microprocessors, controllers or any other suitable type of processors for processing computing executable instructions to control the operation of the device in order to operate as a chunk server, logger, metadata service and/or short-term versioned store. Platform software comprising an operating system 1404 or any other suitable platform software may be provided at the computing-based device to enable application software 1406-1410 to be executed on the device. The application software may comprise one or more of: a log client 1407, a logger 1408, a metadata service 1409 and a gear scheduler 1410.

The computer executable instructions may be provided using any computer-readable media, such as memory 1412. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 1400 it will be appreciated that the storage may be distributed or located remotely and accessed via a network 1420 or other communication link (e.g. using communication interface 1414). The memory may also comprise a chunk store 1416 for storing chunks of data and, in some embodiments, for caching writes which are made during logging mode (e.g. as described above with reference to FIG. 11).

The computing-based device 1400 also comprises a communication interface 1414 which connects the computing-based device to other devices via a network 1420. In an example, where the computing-based device operates as a chunk server, the network 1420 interconnects multiple chunk servers. Where the computing-based device is a primary chunk server, read/write requests from a client may be received by the communication interface 1414. The network 1420 may be any type of network such as a local network or the internet. In an example, the network may be a low latency network to enable fast communication between chunk servers and to minimize delays in servicing read and write requests.

The computing-based device 1400 may also comprise an input/output controller 1422 arranged to output display information to a display device 1424 which may be separate from or integral to the computing-based device 1400. The display information may provide a graphical user interface. The input/output controller 1424 may also arranged to receive and process input from one or more devices, such as a user input device 1426 (e.g. a mouse or a keyboard). In an embodiment the display device 1424 may also act as the user input device 1426 if it is a touch sensitive display device. The input/output controller 1422 may also output data to devices other than the display device, e.g. a locally connected printing device (not shown in FIG. 14).

In an example implementation of a storage system as described above, the MDS and each chunk server may run as a user-level process and a client-side library may be used which exports object read( ), write( ), delete( ) and create( ) calls. In an example, the core system implementation may comprise 10 KLOC of C code with an additional 8 KLOC for the logger and log client implementations. The MDS may be implemented as a deterministic state machine.

Although the present examples are described and illustrated herein as being implemented in a distributed storage system comprising a plurality of servers (to scale up the performance and capacity), the system described is provided as an example and not a limitation. In some embodiments, the system may be a cluster-based system, with servers linked by a high-speed network (e.g. in the case of a data center in one location or building). As those skilled in the art will appreciate, the present examples are suitable for application in a variety of different types of systems, and in a further example of a data center, the computation and storage may be co-located on the same servers and the techniques described above may be integrated with existing techniques for CPU consolidation to create a data center which is more power proportional overall. In such an example, the techniques described above and the CPU consolidation mechanisms are coordinated such that the same servers are targeted for powering down (or entering another low power state) by both mechanisms. Both the CPU load and the I/O load is removed from a server before it can enter a low power state and in many embodiments, locality is preserved while shifting gears (i.e. the co-location of computation with the data it computes on). In another example, the techniques described above may be implemented within a single server storage system comprising multiple disks (which are not arranged as a RAID array) as a means to spin down individual disks within the server.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A storage system for storing a plurality of data objects, each data object comprising at least one chunk of data and the system comprising:
    a plurality of chunk servers arranged to store multiple blocks of data derived from each chunk of data;
    a metadata service arranged to store mappings between data objects and chunks of data; and
    a versioned store,
    wherein the system is arranged to operate in one of a plurality of modes of operation, the plurality of modes of operation comprising:
        a first mode in which a first number of blocks of data derived from a chunk of data are available, and
        at least one reduced power mode in which a reduced number of blocks of data derived from the chunk of data are available and in which a subset of the chunk servers are in a low power state,
    and wherein the versioned store is arranged to store multiple versions of any data written when the system is in a reduced power mode of operation.

2. A storage system according to claim 1, wherein each block of data derived from a chunk comprises a replica of the chunk.

3. A storage system according to claim 2, wherein one replica of the chunk is assigned as a primary replica and wherein the metadata service is further arranged to reassign the primary replica to a different replica before the system switches to a reduced power mode of operation if the primary replica is stored on a server scheduled to enter a low power state.

4. A storage system according to claim 1, wherein each chunk server is assigned to one of a plurality of gear groups and wherein each block of data derived from a chunk of data is stored on a chunk server assigned to a different gear group.

5. A storage system according to claim 4, wherein in a reduced power mode, the subset of the chunk servers in a low power state comprises all the chunk servers assigned to at least one gear group.

6. A storage system according to claim 4, divided into a plurality of fault domains and wherein each block of data derived from a chunk of data is stored on a chunk server assigned to a different gear group and located in a different fault domain.

7. A storage system according to claim 1, further comprising a scheduling service arranged to compute system load for a period of time based on at least one of historical load data and measurements of system load and to select one of the plurality of modes of operation based on the computed system load.

8. A storage system according to claim 7, wherein the scheduling service is further arranged to select the subset of the chunk servers to be in a low power state in the selected one of the plurality of modes of operation.

9. A storage system according to claim 8, wherein the scheduling service is further arranged to transmit schedules to each chunk server identifying one or more periods of time when the chunk server is to enter a low power state.

10. A storage system according to claim 1, wherein the versioned store is further arranged to transfer data from the store to one of more chunk servers when the system changes from a reduced power mode of operation to the first mode of operation.

11. A storage system according to claim 1, wherein the versioned store comprises:
    a plurality of loggers arranged to store data; and
    a log client associated with each chunk server and arranged to send data to multiple loggers on receipt of a write request when the system is in a reduced power mode of operation.

12. A storage system according to claim 11, wherein a logger and a chunk server are co-located on a server.

13. A storage system according to claim 1, wherein the metadata service is further arranged to detect failure of a chunk server and if a chunk server fails when the system is in a reduced power mode of operation, the metadata service is arranged to cause any chunk servers storing blocks of data derived from those chunks with blocks stored on the failed chunk server to exit low power state.

14. A method of storing data objects in a storage system, the system comprising a plurality of groups of servers and the method comprising:
- dividing each data object into a plurality of chunks of data;
- for each chunk of data, storing a block of data derived from the chunk of data on each of a number of servers in different groups; and
- operating the system in one of a plurality of operating modes selected based on system load, the plurality of operating modes comprising:
- a first mode in which a first number of blocks of data derived from a chunk of data are available; and
- at least one reduced power mode in which at least one group of servers are put into a low power state such that a subset of blocks of data derived from each chunk of data are available and in which data written to the storage system is stored in a versioned store.

15. A method according to claim 14, wherein the plurality of operating modes comprises the first mode and a plurality of reduced power modes in which different numbers of blocks of data derived from each chunk of data are available.

16. A method according to claim 14, wherein operating the system in one of a plurality of operating modes selected based on system load comprises:
- computing system load based on at least one of historical load data and measurements of system load; and
- selecting an operating mode based on the computed system load.

17. A method according to claim 14, further comprising, on returning to the first mode from a reduced power mode:
- copying any data stored in the versioned store and relating to a chunk of data to each server storing a block of data derived from the chunk of data.

18. A method according to claim 14, wherein each block of data derived from a chunk of data comprises a replica of the chunk of data and the method further comprising:
- assigning one replica of each chunk of data as a primary replica; and
- prior to entering a reduced power mode: identifying any primary replicas stored in the at least one group of servers to be put into a low power state; and for each identified primary replica, assigning a replica of the chunk of data stored on a server in another group as primary replica.

19. A method according to claim 18, further comprising:
- assigning each chunk of data to a chunk group, wherein chunks within a chunk group are stored on the same servers and wherein the same server stores the primary replica for each chunk within a chunk group.

20. A storage system for storing a plurality of data objects, each data object comprising at least one chunk of data and the system comprising:
- a plurality of servers arranged to store chunks of data and wherein each chunk is replicated across a number of servers;
- a metadata service storing mappings between data objects and chunks of data;
- a scheduling service arranged to predict system load and at times of reduced system load to schedule a subset of the servers to enter a low power mode such that a reduced number of replicas of a chunk of data are available; and
- a versioned store arranged to store data written when at least one server is in a low power mode and to transfer the data stored to the servers when all servers have exited from the low power mode.

* * * * *